US 011455559B2

(12) United States Patent
Patel et al.

(10) Patent No.: US 11,455,559 B2
(45) Date of Patent: Sep. 27, 2022

(54) METHOD AND SYSTEM FOR ESTIMATING RELOCATION COSTS

(71) Applicant: Cartus Corporation, Danbury, CT (US)

(72) Inventors: Keni Patel, Newtown, CT (US); Lynda Jones, Woodbury, CT (US); Imran Karbhari, Plainfield, IL (US); Kader Sakkaria, Naperville, IL (US)

(73) Assignee: CARTUS CORPORATION, Danbury, CT (US)

( * ) Notice: Subject to any disclaimer, the term of this patent is extended or adjusted under 35 U.S.C. 154(b) by 329 days.

(21) Appl. No.: 16/913,525

(22) Filed: Jun. 26, 2020

(65) Prior Publication Data

US 2021/0406740 A1 Dec. 30, 2021

(51) Int. Cl.
*G06N 5/04* (2006.01)
*G06N 20/00* (2019.01)

(52) U.S. Cl.
CPC ............ *G06N 5/048* (2013.01); *G06N 20/00* (2019.01)

(58) Field of Classification Search
CPC ...... G06N 5/048; G06N 20/00; G06Q 10/105; G06Q 10/04
See application file for complete search history.

(56) References Cited

U.S. PATENT DOCUMENTS

| | | | |
|---|---|---|---|
| 10,311,529 B1* | 6/2019 | Noel | G06Q 30/0611 |
| 10,909,482 B2* | 2/2021 | Thornberry | G06Q 50/08 |
| 11,107,104 B1* | 8/2021 | Brannan | G06Q 30/0208 |
| 2011/0082782 A1* | 4/2011 | Komac | G06Q 40/00 |
| | | | 715/764 |
| 2019/0244267 A1* | 8/2019 | Rattner | G06N 20/00 |

* cited by examiner

*Primary Examiner* — Michael Won
(74) *Attorney, Agent, or Firm* — Murtha Cullina LLP

(57) ABSTRACT

A method for improving the estimation of relocation costs including the steps of: generating a relocation costs data-model; performing a dual-model algorithm on the relocation costs data-model to determine a preliminary relocation costs predictive model for a relocation service; receiving a first dataset of a subject to be relocated; analyzing the first dataset with the preliminary relocation costs predictive model to generate a preliminary relocation costs for the relocation service; displaying, on a display of a remote device, the preliminary relocation costs; performing the dual-model algorithm on the relocation costs data-model to determine a supplemental relocation costs predictive model for the relocation service; receiving a second dataset of the subject to be relocated; analyzing the second dataset with the supplemental relocation costs predictive model to generate a supplemental relocation costs for the relocation service; and displaying, on the display of the remote device, the supplemental estimated relocation costs.

20 Claims, 12 Drawing Sheets

METHOD AND SYSTEM FOR ESTIMATING RELOCATION COSTS

FIELD

The present technology relates to the field of cost estimation, and more particularly, to the field of estimating the costs associated with relocating an employee to a new location.

BACKGROUND

Relocating employees is a complex and costly process involving the use of many different relocation services, such as a van-line move, storage at the destination, temporary living at the destination, vehicle transports, home-finding trips by the employee before the relocation, etc. To budget accordingly, an employer looking to relocate an employee, or hire a prospective employee requiring relocation, must obtain accurate cost estimations for all relevant relocation services. Traditionally, relocation costs were estimated based on the average costs of similar relocations, such as relocations from the same origin to the same destination, relocations having approximately the same distance from origin to destination. However, such average estimation costs fail to account for any form of uncertainty of the predictions, and are thus too inaccurate for employers to efficiently budget for prospective relocations.

Current solutions utilize regression models to provide more accurate relocation costs estimations. In machine learning, regression models are a supervised learning technique used to predict a numeric target based on an arbitrary number of covariates. Regression models allow for the formation of a conditional expectation (i.e. a prediction) of the dependent covariate when independent covariates take on a given set of values.

However, a well-known problem with regression models is estimating the uncertainty of individual predictions. The uncertainty of an individual prediction can be quantified via a prediction interval, which is applied to future targets and takes into account the manner in which predictions fluctuate. Yet, current regression modeling approaches utilize a naïve construction of prediction intervals that estimates a constant uncertainty associated with each prediction using a small amount of data that was withheld from the model during its construction (i.e. holdout data). While this approach may improve costs estimation by providing some form of uncertainty, the uncertainty remains constant for all input covariates. Thus, the problem of individual uncertainty remains.

Therefore, there is a need for methods and systems that improve the costs estimation of relocation services by utilizing an improved regression model that assigns uncertainty that varies with covariates to individual predictions.

SUMMARY

Accordingly, a first embodiment of the present technology is directed to a method of estimating relocation costs. The method includes the steps of: generating, at a computing device, first a relocation costs data-model for a first relocation service; performing a dual-model algorithm on the first relocation costs data-model to determine a first preliminary relocation costs predictive model for the first relocation service; receiving, at the computing device and from a remote device, a first dataset of a subject to be relocated, the first dataset comprising the subject's origin location, the subject's destination location, the distance between the origin and destination locations, the subject's job level, and the subject's family size; analyzing the first dataset with the first preliminary relocation costs predictive model to generate a first preliminary relocation costs for the first relocation service; displaying, on a display of the remote device, the first preliminary relocation costs for the first relocation service; performing the dual-model algorithm on the first relocation costs data-model to determine a first supplemental relocation costs predictive model for the first relocation service; receiving, at the computing device and from the remote device, a second dataset of the subject to be relocated, the second dataset comprising the subject's origin location, the subject's destination location, the distance between the origin and destination locations, the subject's job level, the subject's family size, the subject's origin home type, and the number of rooms in the subject's origin home; analyzing the second dataset with the first supplemental relocation costs predictive model to generate a first supplemental relocation costs for the first relocation service; and displaying, on the display of the remote device, the first supplemental relocation costs for the first relocation service.

In some embodiments, the step of performing the dual-model algorithm on the first relocation costs data-model to determine a first preliminary relocation costs predictive model for the first relocation service includes the steps of: determining, from the first relocation costs data-model, a first preliminary training dataset and a first preliminary holdout dataset; selecting a first preliminary target model optimization metric and a first preliminary uncertainty model optimization metric; forming a first preliminary target regression model for the first preliminary training dataset; training the first preliminary target regression model via the first preliminary target model optimization metric in a target model space comprising a plurality of regression models to determine a first preliminary optimal target regression model; forming a first preliminary uncertainty dataset by inputting the first preliminary holdout dataset into the first preliminary optimal target regression model; determining a first preliminary absolute residuals dataset from the first preliminary uncertainty dataset and a first preliminary truth target value dataset for the first preliminary holdout dataset; forming a first preliminary uncertainty regression model from the first preliminary absolute residuals dataset and the first preliminary optimal target regression model; training the first preliminary uncertainty regression model via the first preliminary uncertainty model optimization metric in a prediction band model space comprising the plurality of regression models to determine a first preliminary optimal uncertainty regression model; and forming the first preliminary relocation costs predictive model from the first preliminary optimal target regression model and the first preliminary optimal uncertainty regression model.

In some embodiments, the step of performing the dual-model algorithm on the first relocation costs data-model to determine a first supplemental relocation costs predictive model for the first relocation service includes the steps of: determining, from the first relocation costs data-model, a first supplemental training dataset and a first supplemental holdout dataset; selecting a first supplemental target model optimization metric and a first supplemental uncertainty model optimization metric; forming a first supplemental target regression model for the first supplemental training dataset; training the first supplemental target regression model via the first supplemental target model optimization metric in a target model space comprising a plurality of regression models to determine a first supplemental optimal target regression model; forming a first supplemental uncertainty dataset by inputting the first supplemental holdout dataset into the first supplemental optimal target regression model; determining a first supplemental absolute residuals dataset from the first supplemental uncertainty dataset and a first supplemental truth target value dataset for the first supplemental holdout dataset; forming a first supplemental uncertainty regression model from the first supplemental absolute residuals dataset and the first supplemental optimal target regression model; training the first supplemental uncertainty regression model via the first supplemental uncertainty model optimization metric in a prediction band model space comprising the plurality of regression models to determine a first supplemental optimal uncertainty regression model; and forming the first supplemental relocation costs predictive model from the first supplemental optimal target regression model and the first supplemental optimal uncertainty regression model.

In some embodiments, the method further includes the steps of: generating, at the computing device, a second relocation costs data-model for a second relocation service; performing the dual-model algorithm on the second relocation costs data-model to determine a second preliminary relocation costs predictive model for the second relocation service; analyzing the first dataset with the second preliminary relocation costs predictive model to generate a second preliminary relocation costs for the second relocation service; generating a total preliminary relocation costs from the first preliminary relocation costs and the second preliminary relocation costs; displaying, on the display of the remote device, the total preliminary relocation costs; performing the dual-model algorithm on the second relocation costs data-model to determine a second supplemental relocation costs predictive model for the second relocation service; analyzing the second dataset with the second supplemental relocation costs predictive model to generate a second supplemental relocation costs for the second relocation service; generating a total supplemental relocation costs from the first supplemental relocation costs and the second supplemental relocation costs; and displaying, on the display of the remote device, the total supplemental relocation costs.

In some embodiments, the step of performing the dual-model algorithm on the second relocation costs data-model to determine a second preliminary relocation costs predictive model for the second relocation service includes the steps of: determining, from the second relocation costs data-model, a second preliminary training dataset and a second preliminary holdout dataset; selecting a second preliminary target model optimization metric and a second preliminary uncertainty model optimization metric; forming a second preliminary target regression model for the second preliminary training dataset; training the second preliminary target regression model via the second preliminary target model optimization metric in a target model space comprising a plurality of regression models to determine a second preliminary optimal target regression model; forming a second preliminary uncertainty dataset by inputting the second preliminary holdout dataset into the second preliminary optimal target regression model; determining a second preliminary absolute residuals dataset from the second preliminary uncertainty dataset and a second preliminary truth target value dataset for the second preliminary holdout dataset; forming a second preliminary uncertainty regression model from the second preliminary absolute residuals dataset and the second preliminary optimal target regression model; training the second preliminary uncertainty regression model via the second preliminary uncertainty model optimization metric in a prediction band model space comprising the plurality of regression models to determine a second preliminary optimal uncertainty regression model; and forming the second preliminary relocation costs predictive model from the second preliminary optimal target regression model and the second preliminary optimal uncertainty regression model.

In some embodiments, the step of performing the dual-model algorithm on the second relocation costs data-model to determine a second supplemental relocation costs predictive model for the second relocation service includes the steps of: determining, from the second relocation costs data-model, a second supplemental training dataset and a second supplemental holdout dataset; selecting a second supplemental target model optimization metric and a second supplemental uncertainty model optimization metric; forming a second supplemental target regression model for the second supplemental training dataset; training the second supplemental target regression model via the second supplemental target model optimization metric in a target model space comprising a plurality of regression models to determine a second supplemental optimal target regression model; forming a second supplemental uncertainty dataset by inputting the second supplemental holdout dataset into the second supplemental optimal target regression model; determining a second supplemental absolute residuals dataset from the second supplemental uncertainty dataset and a second supplemental truth target value dataset for the second supplemental holdout dataset; forming a second supplemental uncertainty regression model from the second supplemental absolute residuals dataset and the second supplemental optimal target regression model; training the second supplemental uncertainty regression model via the second supplemental uncertainty model optimization metric in a prediction band model space comprising the plurality of regression models to determine a second supplemental optimal uncertainty regression model; and forming the second supplemental relocation costs predictive model from the second supplemental optimal target regression model and the second supplemental optimal uncertainty regression model.

In some embodiments, the first dataset of the subject to be relocated is received from a first remote device of a first user, and the second dataset of the subject to be relocated is received from a second remote device of a second user. The first preliminary relocation costs is displayed on a display of the first remote device, and the first supplemental relocation costs is displayed on the display of the first remote device and a display of the second remote device.

In some embodiments, the first user is an employer contemplating relocating the subject, and the subject is an employee requiring relocation.

In some embodiments, the relocation service is a van-line move, a van-line move with storage, a return trip home, a temporary living move, a vehicle transport, a home finding trip, a family travel, a pet transport, a pet storage, a career-assistance service, or a rental-assistance service.

In some embodiments, the computing device includes a processor and a memory, and the computing device and the remote device are communicatively coupled through a network.

According to another embodiment of the present technology, a system of estimating relocation costs including a network, a first remote device, a second remote device, and a computing device is provided. The computing device includes a processor. The first and second remote devices are communicatively coupled to the computing device through the network. The computing device is configured to: generate a first relocation costs data-model for a first relocation service; perform, by the processor, a dual-modal algorithm on the first relocation costs data-model to determine a first preliminary relocation costs predictive model for a first relocation service; receive, from the first remote device, a first dataset of a subject to be relocated, the first dataset comprising the subject's origin location, the subject's destination location, the distance between the origin and destination locations, the subject's job level, and the subject's family size; analyze, by the processor, the first dataset with the first preliminary relocation costs predictive model to generate a first preliminary relocation costs for the first relocation service; transmit, via the network, the first preliminary relocation costs to the first remote device; perform, by the processor, the dual-model algorithm on the first relocation data-model to determine a first supplemental relocation costs predictive model for the first relocation service; receive, from the second remote device, a second dataset of the subject to be relocated, the second dataset comprising the subject's origin location, the subject's destination location, the distance between the origin and destination locations, the subject's job level, the subject's family size, the subject's origin home type, and the number of rooms in the subject's origin home; analyze, by the processor, the second dataset with the first supplemental relocation costs predictive model to generate a first supplemental relocation costs for the first relocation service; and transmit, via the network, the first supplemental relocation costs to the first and second remote devices.

In some embodiments, the computing device is further configured to: generate a second relocation costs data-model for a second relocation service, perform, by the processor, the dual-model algorithm on the second relocation data-model to determine a second preliminary relocation costs predictive model for the second relocation service; analyze, by the processor, the first dataset with the second preliminary relocation costs predictive model to generate a second preliminary relocation costs for the second relocation service; transmit, via the network, the second preliminary relocation costs to the first remote device; perform, by the processor, the dual-model algorithm on the second relocation data-model to determine a second supplemental relocation costs predictive model for the second relocation service; analyze, by the processor, the second dataset with the second supplemental relocation costs predictive model to generate a second supplemental relocation costs for the second relocation service; and transmit, via the network, the second supplemental relocation costs to the first and second remote devices.

In some embodiments, the computing device is further configured to: generate a total preliminary relocation costs based on the first preliminary relocation costs for the first relocation service and the second preliminary relocation costs for the second relocation service; transmit, via the network, the total preliminary relocation costs to the first remote device; generate a total supplemental relocation costs based on the first supplemental relocation costs for the first relocation service and the second supplemental relocation costs for the second relocation service; transmit, via the network, the total supplemental relocation costs to the first and second remove devices.

In some embodiments, the dual-modal algorithm includes the steps of: determining, from the relocation costs data-model, a training dataset and a holdout dataset; selecting a target model optimization metric and an interval model optimization metric; forming a target regression model for the training dataset; training the target regression model per the target model optimization metric in a target model space comprising a plurality of regression models to determine an optimal target regression model; forming a prediction band model from the optimal target regression model; training the prediction band model per the interval model optimization metric in a prediction band model space comprising the plurality of regression models to determine an optimal prediction band regression model; and forming a relocation costs prediction model from the optimal target regression model and the optimal prediction band regression model.

In some embodiments, forming the prediction band model includes the steps of: forming a prediction dataset by inputting the holdout dataset into the optimal target regression model; determining an absolute residuals dataset from the prediction dataset and a truth target value dataset for the holdout dataset; and forming the prediction band model from the absolute residuals dataset and the optimal target regression model.

In some embodiments, the training dataset and the holdout dataset each represent about 50% of the relocation costs data-model.

According to an alternative embodiment of the present technology, an apparatus for estimating relocation costs is provided. The apparatus includes a memory storing computer-executable instructions that, when executed by a processor, cause the apparatus to: generate a first relocation costs data-model for a first relocation service; perform a dual-modal algorithm on the first relocation costs data-model to determine a first preliminary relocation costs predictive model and a first supplemental relocation costs predictive model for the first relocation service; receive a first dataset of a subject to be relocated, the first dataset comprising the subject's origin location, the subject's destination location, the distance between the origin and destination locations, the subject's job level, and the subject's family size; analyze the first dataset with the first preliminary relocation costs predictive model to generate a first preliminary relocation costs for the first relocation service; transmit, via a network, the first preliminary relocation costs to a remote device; receive a second dataset of the subject to be relocated, the second dataset comprising the subject's origin location, the subject's destination location, the distance between the origin and destination locations, the subject's job level, the subject's family size, the subject's origin home type, and the number of rooms in the subject's origin home; analyze the second dataset with the first supplemental relocation costs predictive model to generate a first supplemental relocation costs for the first relocation service; and transmit, via the network, the first supplemental relocation costs to the remote device.

In some embodiments, the apparatus further includes computer-executable instructions stored on the memory that, when executed by the processor cause the apparatus to: generate a second relocation costs data-model for a second relocation service; perform the dual-modal algorithm on the second relocation costs data-model to determine a second preliminary relocation costs predictive model and a second supplemental relocation costs predictive model for the second relocation service; analyze the first dataset with the second preliminary relocation costs predictive model to generate a second preliminary relocation costs for the second relocation service; transmit, via the network, the second preliminary relocation costs to the remote device; analyze the second dataset with the second supplemental relocation costs predictive model to generate a second supplemental relocation costs for the second relocation service; transmit, via the network, the second supplemental relocation costs to the remote device; generate a total preliminary relocation costs from the first preliminary relocation costs and the second preliminary relocation costs; transmit, via the network, the total preliminary relocation costs to the remote device; generate a total supplemental relocation costs from the first supplemental relocation costs and the second supplemental relocation costs; transmit, via the network, the total supplemental relocation costs to the remove device.

In some embodiments, the first dataset of the subject to be relocated is received from a first remote device of a first user, and the second dataset of the subject to be relocated is received from a second remote device of a second user. The first preliminary relocation costs is transmitted to the first remote device, and the first supplemental relocation costs is transmitted to the first and second remote devices.

In some embodiments, the dual-model algorithm includes the steps of: determining, from the relocation costs datamodel, a training dataset and a holdout dataset; selecting a target model optimization metric and an interval model optimization metric; forming a target regression model for the training dataset; training the target regression model per the target model optimization metric in a model space comprising a plurality of regression models to determine an optimal target regression model; forming a prediction dataset by inputting the holdout dataset into the optimal target regression model; determining an absolute residuals dataset from the prediction dataset and a truth target value dataset for the holdout dataset; forming a prediction band model from the absolute residuals dataset and the optimal target regression model; training the prediction band model per the interval model optimization metric in the model space to determine an optimal prediction band regression model; and forming a relocation costs prediction model from the optimal target regression model and the optimal prediction band regression model.

Further objects, features, and embodiments of the present technology will be apparent from the drawing figures and below description.

DETAILED DESCRIPTION

Accordingly, embodiments of the present technology are directed to methods, computer-readable media, and apparatuses for estimating the costs of performing relocation services. In some embodiments, when a computing device (e.g., a relocation costs processing server) receives data regarding a subject to be relocated from a remote device (e.g., a mobile device), the computing device processes the data and estimates the costs of relocating the subject (e.g., the costs of transporting the subject and the subject's family and possessions from an origin location to a destination location).

In some embodiments, the automated process utilizes various hardware components (e.g., servers, processors, communication networks, memory devices, etc.) and related computer algorithms to generate costs predictive models for a plurality of relocation services, analyze subject data with the costs predictive models for each required relocation service, and determine the estimated total relocation costs.

Figure 1:
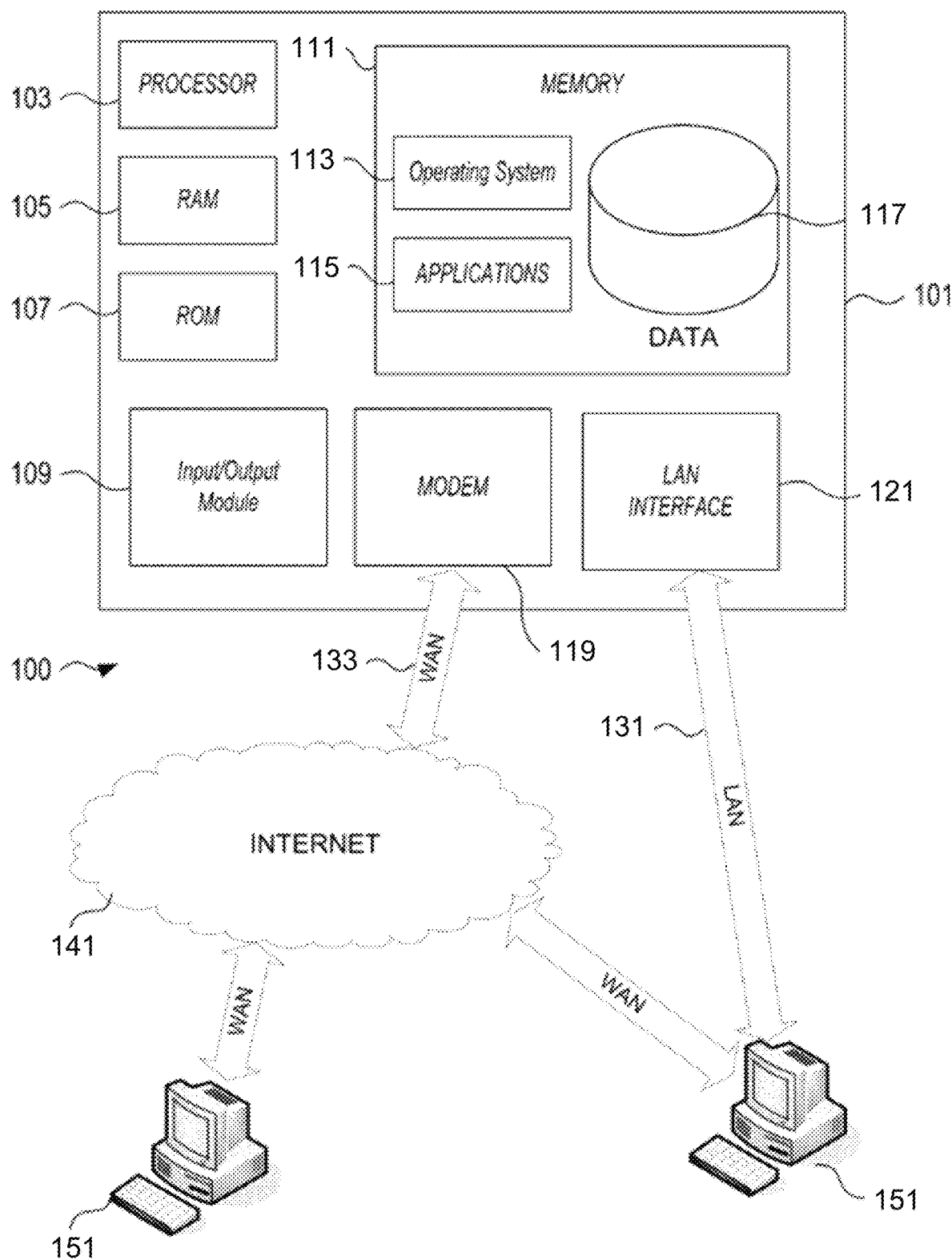
FIG. 1 is block diagram showing an operating environment of a relocation costs estimation method according to an embodiment of the present technology.

FIG. 1 shows a block diagram of a communication system 100 having a costs relocation processing server 101 (e.g., a computer server) that is used according to a first embodiment of the present technology. The server 101 may include a processor 103 for controlling overall operation of the server 101 and its associated components, such as random access memory ("RAM") 105, read only memory ("ROM") 107, input/output module ("I/O") 109, and memory 111.

I/O 109 may include a microphone, keypad, touchscreen, and/or stylus through wish an operator of the costs relocation processing server 101 may provide input, and may also include one or more of a speaker and a display for providing audio and/or visual output. Preferably, software is stored within memory 111 to provide instructions to processor 103 for enabling server 101 to perform various functions. In some embodiments, memory 111 stores software used by the server 101, such as an operating system 113, application programs 115, and an associated data-model 117. Preferably, processor 103 and its associated components enable the server 101 to perform a series of computer-readable instructions to analyze relocation data and determine an estimated costs for performing relocation services.

In preferred embodiments, the server 101 operates in a networked environment supporting connections to one or more remote devices, such as terminals 151. In some embodiments, terminals 151 are personal computers or servers including some or all of the components described above regarding the server 101. In some embodiments, terminals 151 are mobile devices (e.g., mobile phone, tablet, laptop computer, personal digital assistant, etc.) for transmitting relocation data to the server 101 via the networked environment. In other embodiments, terminals 151 are data stores for storing relocation data that has been previously analyzed by the costs relocation processing server 101.

In some embodiments, the networked environment shown in FIG. 1 includes a local area network ("LAN") 131 and a wide area network ("WAN") 133, but may also include other network connections known in the art. In embodiments utilizing a LAN networking environment, the server 101 is connected to the LAN 131 through a network interface or adapter 121. In embodiments utilizing a WAN networking environment, the server 101 includes a modem 119 or other means for establishing communications over the WAN 133, such as the Internet 141. Other embodiments of the present technology contemplate use of other communication protocols known in the art, such as TCP/IP, Ethernet, FTP, HTTP, etc.

In some embodiments, the present technology is operational with other known computing system configurations, such as personal computers, server computers, hand-held or laptop devices, multiprocessor systems, microprocessorbased systems, set top boxes, programmable consumer electronics, network PCs, minicomputers, mainframe computers, distributed computing environments including any of the above systems or devices, etc.

In some embodiments, the present technology is described in the context of computer-executable instructions, such as program modules, being executed by a computer. In some embodiments, the program modules includes routines, programs, objects, components, data structure, etc., that perform particular tasks. In some embodiments, the present technology is practiced in distributed computing environments where tasks are performed by remote processing devices linked through a communications network. In embodiments utilizing a distributed computing environment, program modules are located both local and remote computer storage media including non-transitory memory storage devices, such as hard disk, RAM, ROM, etc.

Figure 2:
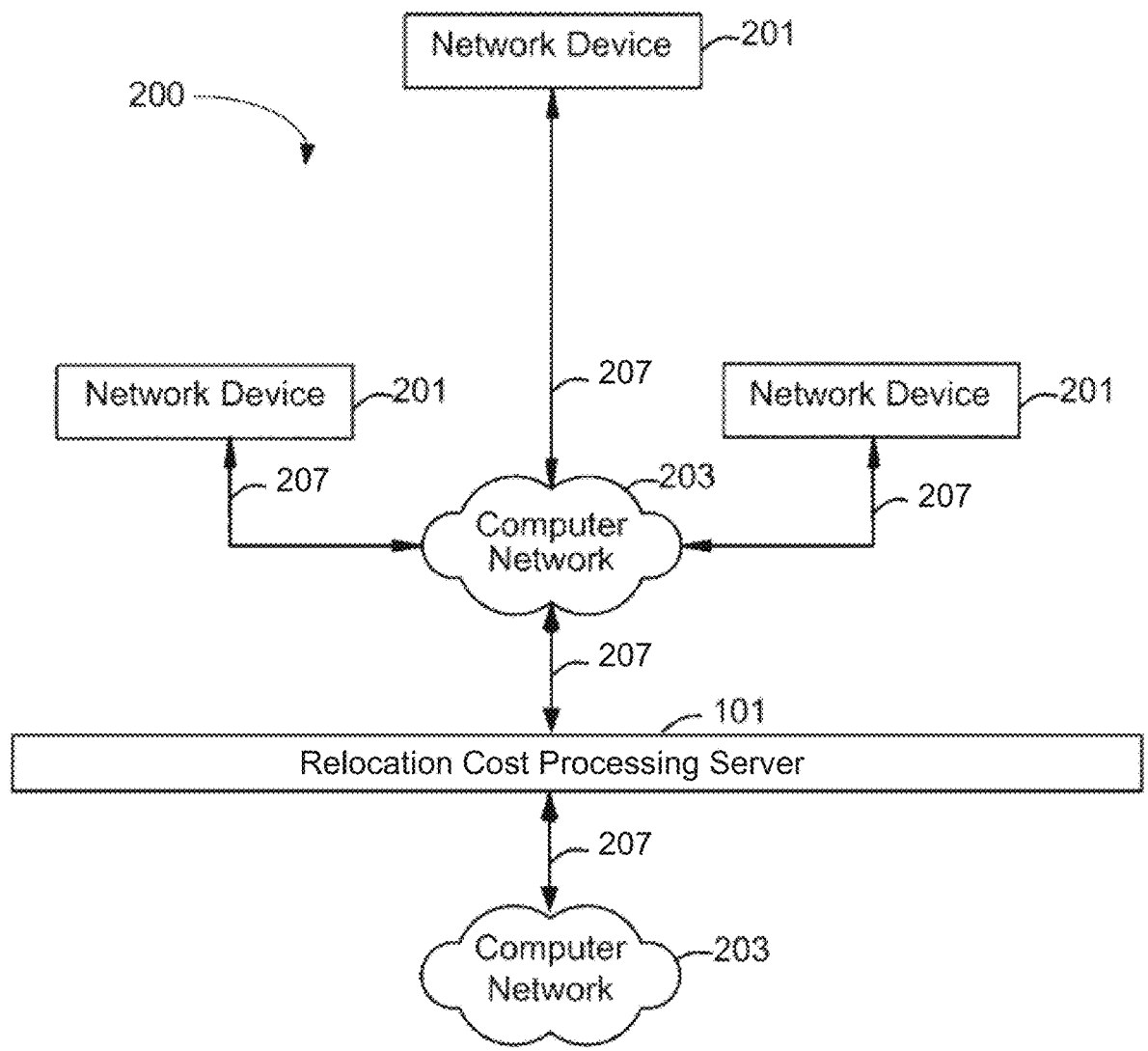
FIG. 2 is a block diagram showing a system of estimating relocation costs according to an embodiment of the present technology.

FIG. 2 shows a relocation costs estimation system 200 for implementing methods according to embodiments of the present technology. System 200 includes one or more network devices 201. In some embodiments, devices 201 are local and/or remote, and are connected by one or more communication links 207 to computer network 203 that is linked via communications links 207 to the relocation costs processing server 101. In some embodiments, network devices 201 perform algorithms used by the server 101 for analyzing relocation data. In some embodiments, network devices 201 are mobile devices (e.g., mobile phone, tablet, laptop computer, personal digital assistant, etc.) configured to gather and transmit relocation data to the server 101. In other embodiments, network device 201 are data stores for storing a data-model of previously-analyzed relocation data. Preferably, the relocation costs processing server 101 is any suitable server, processor, computer, data processing device, or a combination thereof.

In some embodiments, computer network 203 is any suitable computer network, such as the Internet, an intranet, a WAN, a LAN, a wireless network, a digital subscriber line network, a frame relay network, an asynchronous transfer mode network, a virtual private network, or a combination thereof. Preferably, communication links 207 are any communications links suitable for communicating between network devices 201 and serve 101, such as network links, hard-wired links, wireless links, dial-up links, etc.

Figure 3:
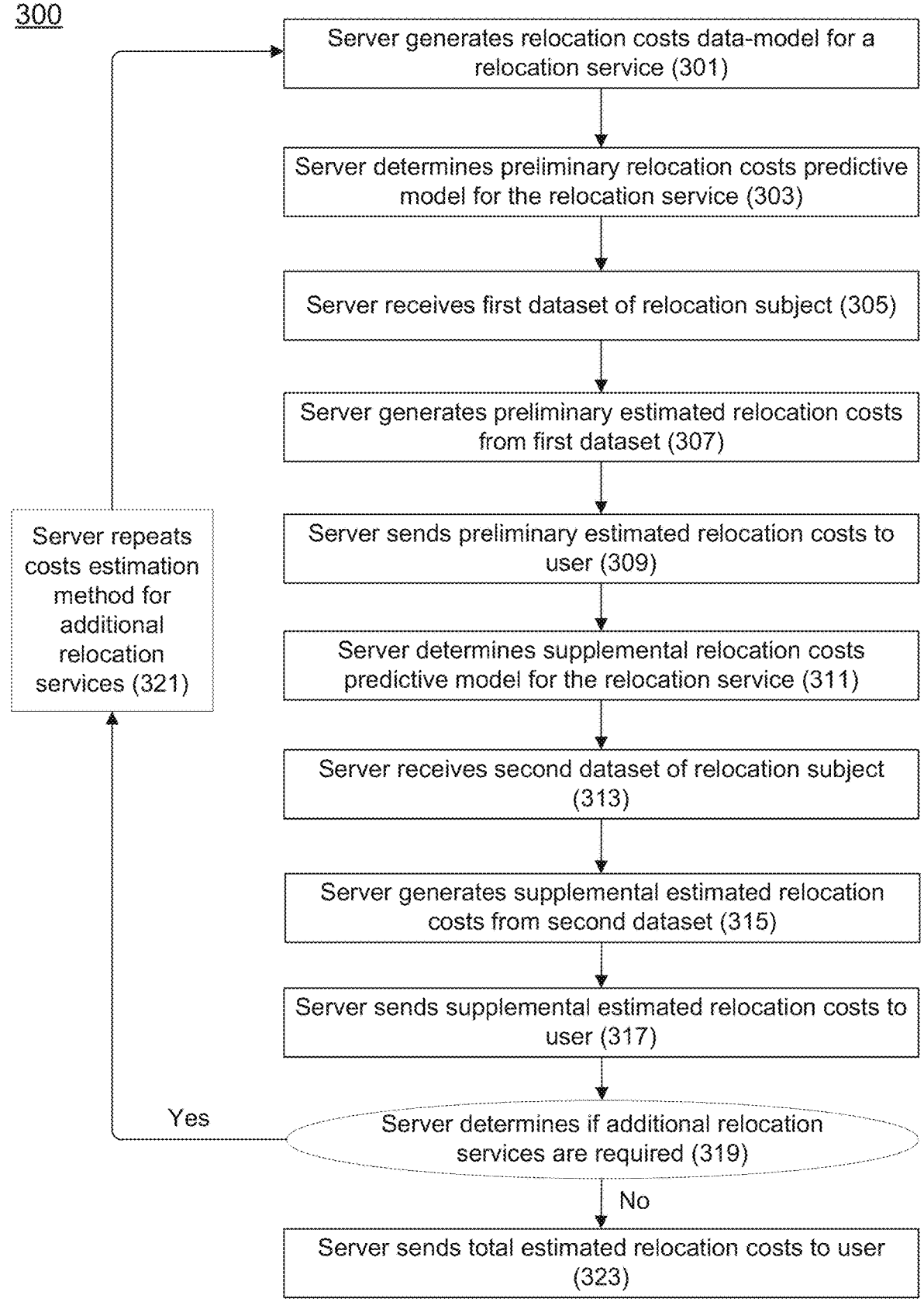
FIG. 3 is a flow chart for a relocation costs estimation method according to an embodiment of the present technology.

FIG. 3 shows an automated relocation costs estimation process 300 according to an embodiment of the present technology. In some embodiments, an application or a webpage related to relocation cost estimation is downloaded onto a remote device (e.g., personal computer, laptop computer, mobile phone, tablet, etc.) of a user to facilitate one or more steps of the process in FIG. 3, as shown in FIGS. 7A-7G. In some embodiments, the user is an employer contemplating relocating the subject to be relocated, which is preferably an employee or a prospective employee of the employer. In some embodiments, the user is the subject to be relocated. In other embodiments, the user is a third party acting on behalf of the subject to be relocated. As used herein, the term "employer" refers to a business entity, an officer/partner/director of a business entity, an employee of a business entity involved in the recruiting and hiring of prospective employees, an individual personally employing other persons, etc.

In some embodiments, an entity managing the relocation costs processing server 101 (e.g., a relocation company) instructs the server 101 to generate a relocation costs data-model 301 compiled from the data related to a plurality of relocations performed by the entity. In some embodiments, the relocation costs data-model is stored in the memory 111 of the server 101. In some embodiments, the relocation costs data-model is stored in one or more of terminals 151 or network devices 201 communicatively coupled to server 101 via a network, as described above. In some embodiments, the relocation costs data-model is compiled from data related to at least ten relocations, at least one-hundred relocations, at least one-thousand relocations, at least ten-thousand relocations, at least one-hundred-thousand relocations, or at least one-million relocations. In some embodiments, the relocation costs data-model is compiled from a range of data obtained from about ten to about one-million relocations, about one-hundred to about five-hundred-thousand relocations, about five-hundred to about one-hundred-thousand relocations, or preferably about one-thousand to about thirty-thousand relocations. In some embodiments, the relocation costs data-model is compiled from relocation data obtained within a period of time, such as the past fifty-years, the past twenty-five-years, the past fifteen-years, the past ten-years, or preferably the past five-years. Such embodiments that use a relocation costs data-model compiled from a recent time period further increases the accuracy of the costs estimates by accounting for economic factors, such as inflation and market trends. In preferred embodiments, the server 101 generates relocation costs data-models for each relocation service offered. For example, in some embodiments, server 101 generates a first relocation costs data-model for a first relocation service (e.g., a van-line move), a second relocation costs data-model for a second relocation service (e.g., home finding trip), a third relocation costs data-model for a third relocation service (e.g., vehicle transport), etc. Each relocation costs data-model for a specific relocation service is preferably compiled from data related to a plurality of relocations where the specific relocation service was performed. In some embodiments, each relocation costs data-model is a subset of a total relocation costs data-model, which is formed of all recorded data related to relocations performed by the entity.

In some embodiments, server 101 then determines a first preliminary relocation costs predictive model for a relocation service 303. In preferred embodiments, server 101 determines the first preliminary relocation costs predictive model by performing a dual-model algorithm shown in FIG. 4 and described below. The relocation service is selected from a plurality of relocation services. In some embodiments, the plurality of relocation services includes van-line move (e.g., a professional van-line ships household goods and personal effects, including delivery and unloading of goods at destination), storage (e.g., the costs of storing the household goods at a storage facility), van-line move with storage (e.g., a "van-line move" including the costs of storing the household goods at a storage facility and the costs of transporting the household goods to the storage facility and from the storage facility to the destination), return trip home (e.g., employees who must report to their new work location before the final move), temporary living (e.g., employee cannot move into new residence immediately upon arrival at destination), vehicle transport (e.g., transport of vehicles from origin to destination), home finding trip (e.g., travel, lodging, vehicle rental, and meal expenses incurred by an employee on a trip to explore the destination to preview homes, schools, and community), family travel (e.g., costs of the final trip from origin to destination for the employee and employee's family, including meals, lodging, and travel expenses), one-time payment (e.g., a cash payment from employer to employee to cover additional travel expenses not otherwise accounted for), and miscellaneous services (e.g., other services needed by the employee, including vehicle transport, pet transport, career assistance, rental assistance, therapy, etc.). In some embodiments, miscellaneous services include vehicle transport, pet transport, and pet boarding services.

Figure 5:
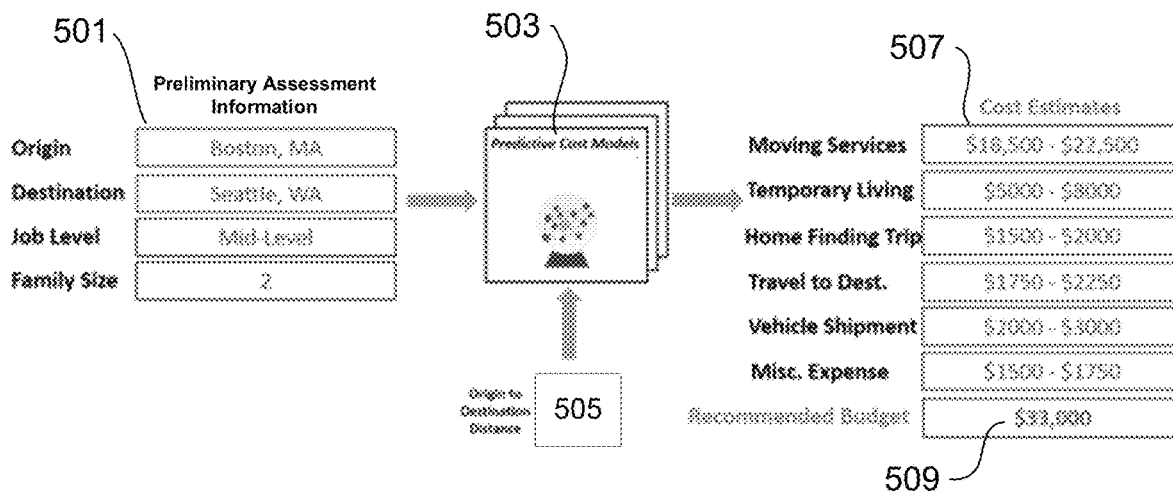
FIG. 5 is a block diagram showing an exemplary relocation cost estimation according to an embodiment of the present technology.

In some embodiments, the server 101 then receives a first dataset of relocation data related to the subject to be relocated 305. In some embodiments, the user transmits the first dataset to the server 101 from a network device 201 via the network. In some embodiments, the first preliminary relocation costs predictive model performs a preliminary assessment, which is a costs prediction based on a minimal amount of information about the proposed relocation, as shown in FIG. 5. In some embodiments, the information required for the preliminary assessment is provided by a user who has limited knowledge about the relocation subject because the user is not the relocation subject, such as an employer (user) looking to relocate an employee (subject). In such embodiments, the first dataset includes such information as the origin location, the destination location, the distance between the origin and destination locations (preferably, the server 101 obtains the distance by accessing a web-based mapping API 505, such as Google Maps, Bing Maps, MapQuest, etc., as shown in FIG. 5), the subject's job level (e.g., junior-level, mid-level, senior-level), and the subject's family size. In some embodiments, the server 101 then analyzes the first dataset with the first preliminary relocation costs predictive model to generate a first preliminary estimated relocation costs 307. In some embodiments, the first estimated relocation costs is a range. In other embodiments, the first estimated relocation costs is an exact number. In some embodiments, the server 101 then transmits the first estimated relocation costs to the user 309, which is preferably displayed on a display screen of the user's network device 201. In some embodiments, the user determines to proceed with the proposed relocation based on the preliminary assessment, and instructs the server 101 to perform a supplemental assessment to generate a more detailed, accurate costs estimation, as discussed below.

Figure 6:
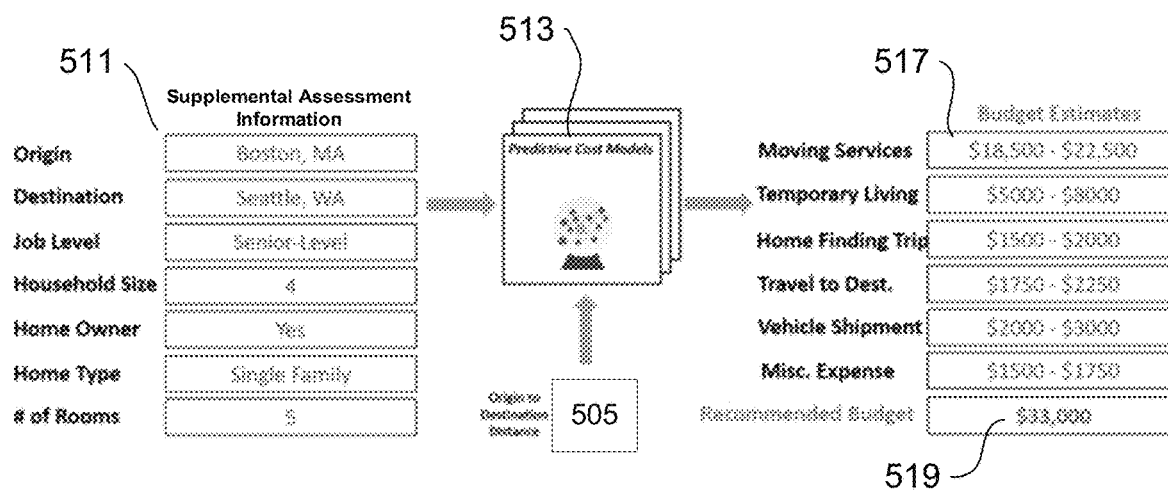
FIG. 6 is a block diagram showing an exemplary relocation costs estimation according to another embodiment of the present technology.

In some embodiments, the server 101 then determines a first supplemental relocation costs predictive model for the relocation service 311. In preferred embodiments, server 101 determines the first supplemental relocation costs predictive model by performing a dual-model algorithm shown in FIG. 4 and described below. In some embodiments, the server 101 then receives a second dataset of relocation data related to the subject to be relocated 313. In some embodiments, a user transmits the second dataset to the server 101 from a network device 201 via the network. In some embodiments, the first supplemental relocation costs predictive model performs a supplemental assessment, which is a costs prediction based on an expanded set of information about the proposed relocation, as shown in FIG. 6. In some embodiments, the user providing the information required for the supplemental assessment is the relocation subject, and as such is most knowledgeable about the details required for an accurate relocation costs estimation. In some embodiments, the user providing the information required for the supplemental assessment is a third party (i.e. not the employer or employee) with detailed knowledge about the subject. In some embodiments, the second dataset includes such information as the origin location, the destination location, the distance between the origin and destination locations (preferably, the server 101 obtains the distance by accessing a web-based mapping API 505, such as Google Maps, Bing Maps, MapQuest, etc., as shown in FIG. 6), the subject's job level (e.g., junior-level, mid-level, senior-level), the subject's family size, the subject's home type (e.g., apartment, condo, townhouse, single family house, etc.), and the number of rooms in the subject's home. In some embodiments, the second dataset further includes information related to the number and types of vehicles owned by the subject. In other embodiments, the second dataset further includes information related to the number and type of pets owned by the subject. In some embodiments, the second dataset further includes miscellaneous items, as discussed below regarding FIG. 7F. In some embodiments, server 101 then analyzes the second dataset with the first supplemental relocation costs predictive model to generate a first supplemental estimated relocation costs 315. In some embodiments, the first supplemental estimated relocation costs is a range. In other embodiments, the first supplemental estimated relocation costs is an exact number. In some embodiments, the server 101 then transmits the first supplemental estimated relocation costs to the user 317, which is preferably displayed on a display screen of the user's network device 201.

In some embodiments, the server 101 then determines if costs estimates for additional relocation services are required. If the server 101 determines that additional relocation services are required, then server 101 will repeat the method described above (steps 301-319 shown in FIG. 3) until the server 101 has generated estimated relocation costs for all required relocation services. In some embodiments, the server 101 makes this determination by analyzing the relocation datasets received from the user. For example, if the user includes vehicle information in the relocation data, then the server 101 will repeat the relocation costs estimation method for a second relocation service, namely, vehicle transport. In some embodiments requiring costs estimates for multiple relocation services, the server 101 will repeat the cost estimation method described above by generating a second relocation costs data-model for a second relocation service 301; determine a second preliminary relocation costs predictive model for the second relocation service 303; generate a second preliminary estimated relocation costs by analyzing the first dataset with the second preliminary relocation costs predictive model 307; transmitting second preliminary estimated relocation costs to the user 309; determining a second supplemental relocation costs predictive model for the second relocation service 311; generate a second supplemental estimated relocation costs by analyzing the second dataset with the second supplemental relocation costs predictive model 315; and transmitting the second supplemental estimated relocation costs to the user 317. This method is preferably repeated as many times as necessary to generate costs estimations for all required relocation services (e.g., it is repeated for a third relocation service, a fourth relocation service, a fifth relocation service, etc.).

When the server 101 determines that additional relocation services are not required, the server 101 transmits the total estimated relocation costs to the user 323. The total estimated preliminary relocation costs is generated from the first, second, etc. preliminary estimated relocation costs, and the total estimated supplemental relocation costs is generated from the first, second, etc. supplemental estimated relocation costs. The total estimated preliminary relocation costs 509 is shown in FIG. 5, and the total estimated supplemental relocation costs 519 is shown in FIG. 6. In some embodiments, the total estimated relocation costs is a range. In other embodiments, the total estimated relocation costs is an exact number. In some embodiments, the first dataset is provided by a first user, such as an employer looking to relocate an employee, and the second dataset is provided by a second user, such as the employee to be relocated. In some embodiments, the estimated relocations costs are transmitted to the network devices 201 of both the first and second users. In some embodiments, the preliminary and total preliminary estimated relocation costs are transmitted to the first user's network device 201, and the supplemental and total supplemental estimated relocation costs are transmitted to the first and second users' network devices 201.

The present technology contemplates variations in the order in which the above described method steps are performed. For example, in some embodiments, the server 101 generates the relocation costs data-models and determines the preliminary and supplemental costs predictive models for every potential relocation service before a user transmits a relocation dataset to the server 101. In some embodiments, the preliminary estimated relocation costs for all required relocation services and the total preliminary estimated relocation costs are generated and transmitted to the employer before performing the supplemental assessment.

Figure 4:
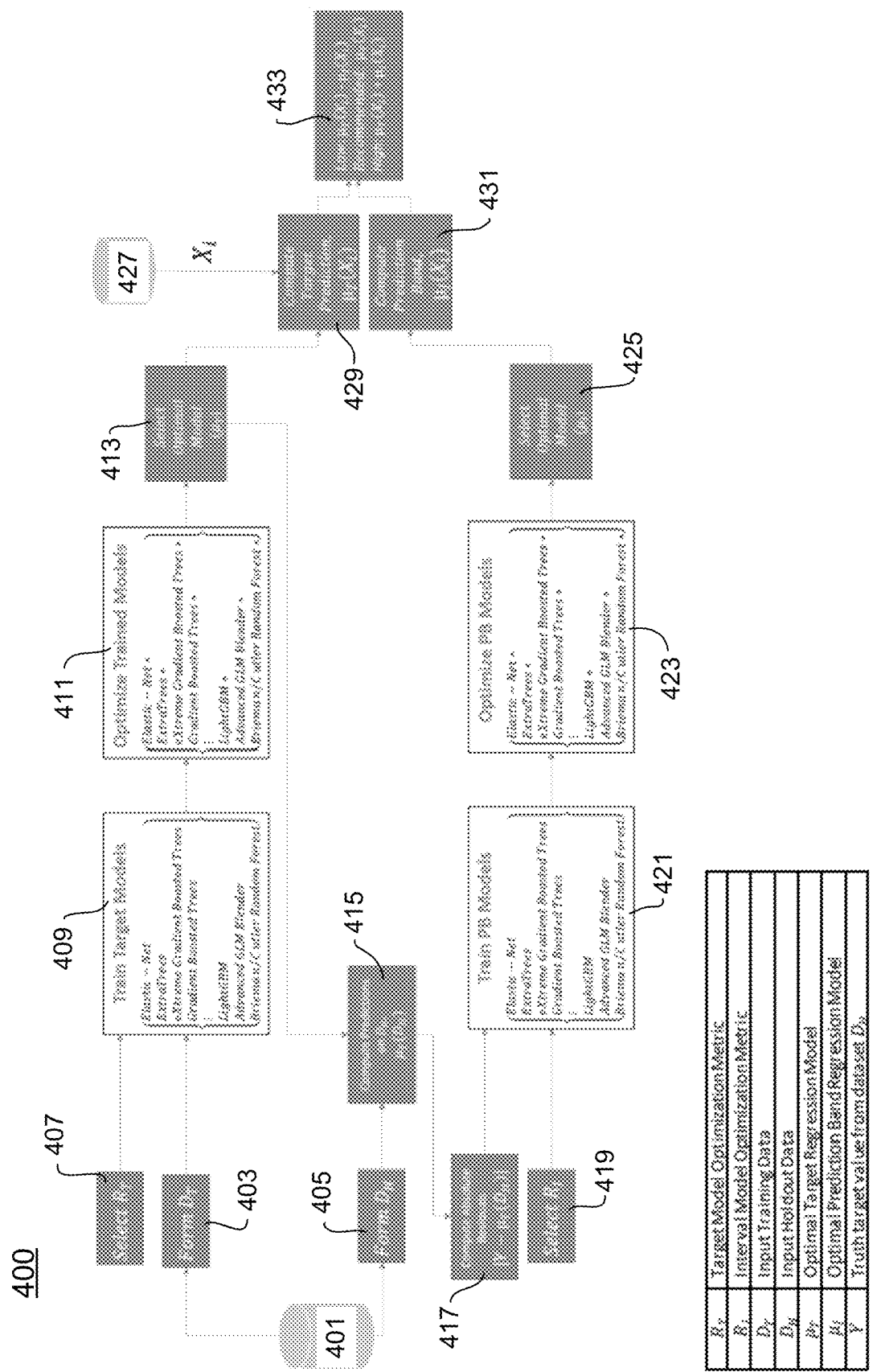
FIG. 4 is a flow chart for a costs estimation algorithm used in embodiments of the relocation costs estimation method of FIG. 3.

FIG. 4 is a flowchart of a dual-model algorithm 400 used in embodiments of the methods and systems for relocation costs estimation described above. In some embodiments, the algorithm requires independent and identically distributed regression data $$Z_1, \ldots, Z_n \sim P \quad (1)$$

Where each $Z_i = (X_i, Y_i)$ is a random variable in $R^d \times R$, comprised of a response variable $Y_i$ and a d-dimensional vector of covariates $X_i = X_{i(1)}, \ldots, X_{i(d)}$. In some embodiments, the regression function is formulated as $$\mu(x) = E(Y|X=x), x \in R^d \quad (2)$$

In some embodiments, the algorithm is configured to predict a new response output $Y_{n+1}$ using a covariate set $X_{n+1}$, with no assumptions on the statistical characteristics of $\mu$ and P. Assuming a miscoverage level $\alpha \in (0,1)$, some embodiments construct a prediction band $C \subseteq R^d \times R$ using only samples from $Z_1, \ldots, Z_n \sim P$ while maintaining $$P(Y_{n+1} \in C(X_{n+1})) \geq 1-\alpha \quad (3)$$

In some embodiments, the algorithm is configured to achieve three objects. The first objective is to generate prediction bands that have validity using a finite number of samples without prior assumptions on the model $\mu$ and distribution P. The second objective is to generate prediction bands that adapt to nontrivial variations in the covariates. The third objective is to build optimal regression models for both the target and the prediction band according to a specified error metric, e. Preferably, the algorithm is configured to find models $\mu(x)_{target}$ and $\mu(x)_{interval}$ allowing the formation of the prediction band, $C(X_{n+1})$, surrounding the target prediction $Y_{n+1}$ resulting in a prediction band defined as $$C(X_{n+1}) = [Y_{n+1} - C(X_{n+1}), Y_{n+1} + C(X_{n+1})] \quad (4)$$

In some embodiments, for any target regression model $\mu(x)$, the residual error function is defined as $$R_i = \frac{|Y_i - \mu(X_i)|}{\partial(X_i)}, i = 1, \ldots, n \quad (5)$$

Where $\partial(X_i) = (Y - \mu(X))|X=x), x \in R^d$ is an estimate of the conditional error metric on the regression model $\mu(x)$. In some embodiments, the selection of the error metric is chosen according to the objective of the predictive regression model.

Current methods of creating prediction bands lead to exactly or near exactly constant prediction bands. This property, the width of $C(X_n)$ being nearly immune to X, is acceptable if the residual does not vary substantially as X varies. However, in most real-world scenarios the residual variance varies substantially with X The algorithm of the present technology allows the prediction band to adapt accordingly to the input X Embodiments of the present technology accomplish this by forming prediction intervals that mimic real-world behavior along with an implementation of an algorithm to search for optimal models, for both the target prediction and the prediction interval (i.e. uncertainty), in a large space of possible models (e.g., about fifty predictive regression model types).

Referring to FIG. 4, the relocation costs data-model 401, which is used in some embodiments as the full dataset upon which the target and prediction band models are built, is represented as $$D = \{Z_1, \ldots, Z_n\} \sim P \quad (6)$$

Preferably, the relocation costs data-model 401 is split into two datasets: training dataset 403 used for training the target regression model, represented as $$D_T \subseteq D \quad (7)$$

and holdout dataset 405 used for training a prediction band (i.e. uncertainty) model, represented as $$D_H \subseteq D - D_T \quad (8)$$

Preferably, the training dataset 403 and the holdout dataset 405 each contain about 50% of the relocation costs data-model 401. Embodiments of the present technology contemplate other percentage splits of the relocation costs data-model 401, such as 40/60, 30/70, 20/80, and 10/90. In some embodiments, the training dataset 403 and the holdout dataset 405 contain percentage ranges of the relocation costs data-model 401, such as each of datasets 403/405 containing about 40% to about 60%, about 30% to about 70%, about 20% to about 80%, or about 10% to about 90% of the relocation costs data-model 401. As used herein, the term "about" used to describe a numerical value or range includes both the exact numbers listed and a reasonable range surrounding the exact number. For example, a recitation of "about 50%" includes 50% and may reasonably include the range 45%-55%.

In some embodiments, by inputting the training dataset 403 into equation (2), a target regression model, $\mu_T(x)$, is formed as $$\mu_T(x) = E(Y|X=x), x \in D_T \quad (9)$$

Preferably, the target regression model is trained in a target model space 409, resulting in a trained target model space 411. During each execution of the algorithm, every model in the model space is constructed according to a specified error metric 407. The model that minimizes the error metric 407 is chosen as the optimal target regression model 413.

In some embodiments, predictions on the holdout dataset 415 are computed by inputting the holdout dataset 405 into the optimal target regression model 413. In some embodiments, by comparing the predictions 415 with the truth target value from the holdout dataset 405 (i.e. the actual results from the relocations that form the holdout dataset) to compute absolute residuals 417, a prediction band model, (x), is formed as $$\mu_I(x)=E(|Y-\mu_T(x)||X=x), x \in D_H \quad (10)$$

Preferably, the prediction band (uncertainty) model is trained in a prediction band (uncertainty) model space 421, resulting in a trained prediction band (uncertainty) model space 423. During each execution of the algorithm, every model in the model space is constructed according to a specified error metric 419. The model that minimizes the error metric 419 is chosen as the optimal prediction band (uncertainty) regression model 425.

In some embodiments, the optimal target regression model 413 and the optimal prediction band (uncertainty) regression model 425 form a preliminary relocation costs predictive model for a relocation service 303. The costs estimation algorithm is preferably executed again under different parameters to determine optimal target and prediction band (uncertainty) regression models to form a supplemental relocation costs predictive model for the relocation service 311. Likewise, the costs estimation algorithm is executed under different parameters to determine the preliminary and supplemental models for each relocation service. In some embodiments, the relocation costs data-model 401 is updated as additional relocation services are performed, and the various relocation costs predictive models are periodically (e.g., daily, weekly, monthly, yearly, etc.) retrained for improved optimization.

After the server 101 receives relocation data 427 from a user (e.g., the first dataset 305 or the second dataset 313), the server 101 inputs the relocation data 427 into the optimal target regression model 413 and the optimal prediction band (uncertainty) regression model 425 to compute a target prediction 429 and a prediction band (uncertainty) 431, which form the estimated relocation costs 433 for the respective relocation service. Preferably, a relocation costs predictive model (preliminary or supplemental) according to embodiments of the present technology analyzes the received subject data simultaneously with both the predictive model's optimal target regression model and optimal uncertainty regression model to generate a relocation costs estimate. The optimal target regression model makes a prediction of the relocation costs, and the optimal uncertainty regression model makes a prediction of the uncertainty in the target prediction. As shown in FIG. 4, the target prediction 429 is the recommended costs estimation, and the prediction band 431 determines the low and high bounds of a costs estimation range surrounding the recommended costs estimation.

In some embodiments, the relocation costs predictive models analyze the entirety of the subject's datasets when generating a costs estimate for a specific relocation service. Preferably, each separate component data of the subject's datasets are accorded a specific weight percentage representing the data's importance in generating a costs estimate for a specific relocation service. As shown below, Table 1 shows the relative importance of exemplary subject data for the preliminary assessment divided into exemplary relocation services, and Table 2 shows the relative importance of exemplary subject data for the supplemental assessment divided into exemplary relocation services. Each relocation service listed in the tables is subdivided into the target and uncertainty regression models used in the dual-model algorithm described above. The weight percentages range from 0% to 100%, with 0% being least important and 100% being most important. For example, in preferred embodiments, the target regression model for a preliminary assessment of a family travel relocation service places the most weight on the distance traveled for the relocation (100%), and places the least weight on the origin location (0%). The present technology contemplates embodiments assigning different weight percentages to the subject data. In some embodiments, only a portion of the subject data is analyzed, with the selected portion being determined by the relocation service, such as, for example, a costs estimate for a vehicle transport service only requiring analysis of the distance traveled, family size, and job level data.

TABLE 1

| Preliminary Assessment | Distance | Family Size | Job Level | Destination City | Destination State | Origin City | Origin State |
|---|---|---|---|---|---|---|---|
| Family Travel: Target Model | 100% | 17% | 1% | 1% | 1% | 0% | 0% |
| Family Travel: Uncertainty Model | 100% | 13% | 1% | 1% | 1% | 0% | 0% |
| Home Finding: Target Model | 100% | 29% | 4% | 11% | 11% | 5% | 5% |
| Home Finding: Uncertainty Model | 100% | 37% | 2% | 2% | 6% | 1% | 2% |
| Van-Line Move: Target Model | 41% | 100% | 22% | 14% | 0% | 6% | 0% |
| Van-Line Move: Uncertainty Model | 67% | 100% | 32% | 15% | 6% | 9% | 5% |
| Rental Assistance: Target Model | 8% | 16% | 13% | 30% | 100% | 0% | 0% |
| Rental Assistance: Uncertainty Model | 100% | 34% | 14% | 0% | 74% | 0% | 40% |
| Return Trip: Target Model | 100% | 13% | 3% | 1% | 1% | 0% | 1% |
| Return Trip: Uncertainty Model | 100% | 44% | 0% | 0% | 1% | 0% | 1% |
| Temporary Living: Target Model | 16% | 28% | 100% | 60% | 52% | 25% | 0% |
| Temporary Living: Uncertainty Model | 29% | 38% | 100% | 91% | 57% | 40% | 25% |
| Vehicle Transport Target Model | 100% | 39% | 1% | 4% | 3% | 2% | 2% |
| Vehicle Transport Uncertainty Model | 51% | 100% | 0% | 2% | 4% | 0% | 0% |

TABLE 1-continued

| Preliminary Assessment | Distance | Family Size | Job Level | Destination City | Destination State | Origin City | Origin State |
|---|---|---|---|---|---|---|---|
| Storage: Target Model | 20% | 100% | 29% | 19% | 10% | 9% | 5% |
| Storage: Uncertainty Model | 34% | 100% | 46% | 39% | 9% | 28% | 13% |
| One-Time Payment: Target Model | 32% | 49% | 100% | 56% | 71% | 33% | 42% |
| One-Time Payment: Uncertainty Model | 32% | 41% | 100% | 39% | 55% | 23% | 30% |
| Miscellaneous Services: Target Model | 43% | 37% | 100% | 45% | 66% | 26% | 24% |
| Miscellaneous Services: Uncertainty Model | 10% | 37% | 100% | 36% | 19% | 11% | 9% |

TABLE 2

| Supplemental Assessment | Distance | Family Size | Job Level | Destination City | Destination State | Origin city | Origin State | Number Rooms | Home Own Status | Home Type |
|---|---|---|---|---|---|---|---|---|---|---|
| Family Travel: Target Model | 100% | 16% | 2% | 3% | 2% | 1% | 1% | 1% | 1% | 1% |
| Family Travel: Uncertainty Model | 100% | 25% | 4% | 7% | 6% | 1% | 4% | 2% | 1% | 1% |
| Home Finding: Target Model | 100% | 59% | 21% | 21% | 14% | 3% | 6% | 10% | 0% | 10% |
| Home Finding: Uncertainty Model | 100% | 85% | 5% | 9% | 23% | 6% | 5% | 2% | 7% | 1% |
| Van-Line Move: Target Model | 36% | 62% | 38% | 28% | 8% | 9% | 7% | 100% | 30% | 11% |
| Van-Line Move: Uncertainty Model | 36% | 100% | 70% | 44% | 9% | 23% | 12% | 90% | 75% | 14% |
| Rental Assistance: Target Model | 21% | 0% | 22% | 99% | 100% | 11% | 16% | 21% | 0% | 0% |
| Rental Assistance: Uncertainty Model | 0% | 10% | 8% | 8% | 100% | 0% | 0% | 0% | 9% | 0% |
| Return Trip: Target Model | 100% | 6% | 14% | 10% | 28% | 4% | 8% | 4% | 27% | 2% |
| Return Trip: Uncertainty Model | 100% | 24% | 50% | 34% | 42% | 6% | 34% | 28% | 58% | 19% |
| Temporary Living: Target Model | 6% | 11% | 100% | 74% | 59% | 21% | 10% | 44% | 97% | 5% |
| Temporary Living: Uncertainty Model | 51% | 38% | 100% | 93% | 89% | 49% | 29% | 88% | 85% | 0% |
| Vehicle Transport Target Model | 100% | 25% | 0% | 0% | 6% | 0% | 7% | 7% | 6% | 0% |
| Vehicle Transport Uncertainty Model | 44% | 100% | 16% | 15% | 14% | 0% | 14% | 57% | 28% | 11% |
| Storage: Target Model | 40% | 72% | 30% | 23% | 9% | 8% | 7% | 100% | 77% | 12% |
| Storage: Uncertainty Model | 29% | 62% | 10% | 50% | 0% | 0% | 0% | 98% | 100% | 0% |
| One-Time Payment: Target Model | 43% | 22% | 100% | 67% | 62% | 35% | 25% | 19% | 74% | 26% |
| One-Time Payment: Uncertainty Model | 35% | 26% | 100% | 64% | 43% | 28% | 25% | 17% | 76% | 11% |
| Miscellaneous Services: Target Model | 58% | 21% | 100% | 67% | 79% | 29% | 21% | 34% | 82% | 0% |
| Miscellaneous Services: Uncertainty Model | 11% | 29% | 100% | 60% | 40% | 17% | 10% | 9% | 64% | 0% |

In preferred embodiments, the algorithm is configured to select regression models that minimize the error metrics, $R_T$ and $R_I$, for both the target and prediction band (uncertainty) models, respectively. Some of the difficulties overcome by the present technology are that (1) the possible space of model types is large; (2) the prediction band (uncertainty) model has a direct dependence on the selection of the target prediction model, i.e. $R_I = F(x, \mu_T, R_T)$; and (3) the resulting search space can be as large as $N^2 + N$.

In some embodiments, the model space for the target is denoted by $$M_T = \{\mu_1^T, \mu_2^T, \ldots, \mu_N^T\} \quad (11)$$

In some embodiments, the model space for the prediction band (uncertainty) model is denoted by $$M_I = \begin{Bmatrix} \mu_{1,1}^I & \cdots & \mu_{1,N}^I \\ \vdots & \ddots & \vdots \\ \mu_{N,1}^I & \cdots & \mu_{N,N}^I \end{Bmatrix} \quad (12)$$

Preferably, the algorithm utilizes a pipeline search across a large space of possible models and model parameters and selected the optimally performing models at each stage. In some embodiments, the pipeline is implemented in the Python programming language and yields near optimal models for $\mu_T(x)$ and $\mu_f(x)$ in less than two hours for constituent data tables of size up to 100,000×10. In some embodiments, the model spaces are formed of a plurality of models, such as Elastic-Net Regressor Variants (including L2/Gamma Deviance, L2/Gamma Deviance with Binned Numeric Features, L2/Poisson Deviance, L2/Tweedie Deviance, and Gamma Deviance/Alpha), Eureqa Generalized Additive Model, Eureqa Regressor, ExtraTrees Regressor, eXtreme Gradiant Boosted Trees Regressor (including Early Stopping and Early Stopping Gamma Loss), Generalized Additive Model, Gradient Boosted Trees Regressor, Light Gradient Boosted Trees Regressor, Light Gradient Boosted Trees Regressor on ElasticNet Predictions, LightGBM Random Forest Regressor, Linear Regressor, Mean Response Regressor, RandomForest Regressor, Ridge Regressor, RuleFit Regressor, TensorFlow Deep Learning Regressor, Vowpal Wabbit Regressor, Vowpal Wabbit Stagewise Polynomial Regressor, Vowpal Wabbit Low Rank Quadratic Regressor, Adaboost Regressor, Auto-tuned Stochastic Gradient Descent Regressor, Decision Tree Regressor, Dropout Additive Regression Trees Regressor, GLM Blender, Advanced GLM Blender, ENET Blender, AVG Blender, Advanced AVG Blender, and Brieman and Cutler Random Forest Regressor. Other embodiments of the present technology contemplate forming the model spaces of any other models known in the art and combinations thereof.

FIGS. 5-6 are block diagrams showing the relocation costs estimation method according an exemplary embodiment of the present technology. FIG. 5 shows a relocation costs estimation based on preliminary assessment information 501, and FIG. 6 shows a relocation costs estimation based on supplemental assessment information 511. In some embodiments, the preliminary assessment information 501 includes the information discussed above regarding the first dataset of the subject to be relocated, and the supplemental assessment information 511 includes the information discussed above regarding the second dataset of the subject to be relocated. Preferably, the preliminary assessment information 501 is input into the preliminary predictive models 503 (which are preferably formed according to the dual-model algorithm discussed above regarding FIG. 4) for each required relocation service to generate the preliminary costs estimates 507 for the respective relocation services. A total preliminary relocation costs 509 is then determined from the preliminary costs estimates 507. In some embodiments, the preliminary assessment information 501 (which is a limited dataset) is provided by an employer contemplating relocating a subject (which is preferably an employee or prospective employee). The employer can use the total preliminary relocation costs 509 to determine if the proposed relocation is cost-effective (i.e. in the employer's budget).

In some embodiments, if the employer determines that the proposed relocation is worth pursuing, then the supplemental assessment is performed to generate a more detailed and accurate relocation costs estimate, as shown in FIG. 6. Preferably, the supplemental information 511 is input into the supplemental predictive models 513 (which are preferably formed according to the dual-model algorithm discussed above regarding FIG. 4) for each required relocation service to generate the supplemental costs estimates 517 for the respective relocation services. A total supplemental relocation costs 519 is then determined from the supplemental costs estimates 517. In some embodiments, the supplemental assessment information 511 (which is an expanded dataset relative to the preliminary assessment information 501) is provided by the subject to be relocated, or a third party user acting on behalf of the subject to be relocated.

Figure 7A:
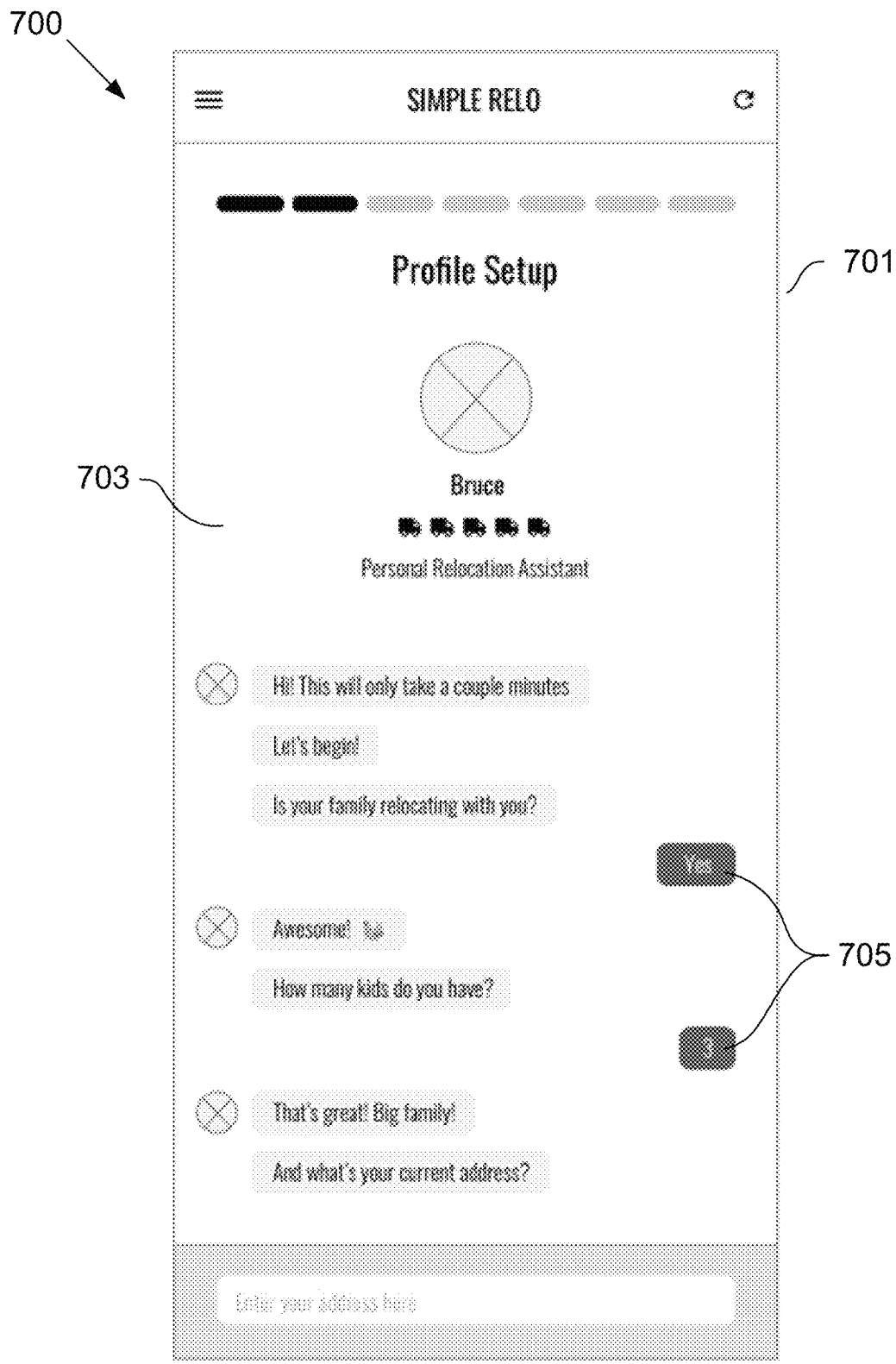
FIGS. 7A-7G show a series of display screens displayed to a user utilizing a relocation costs estimation application stored on a mobile device according to an embodiment of the present technology.
Figure 7B:
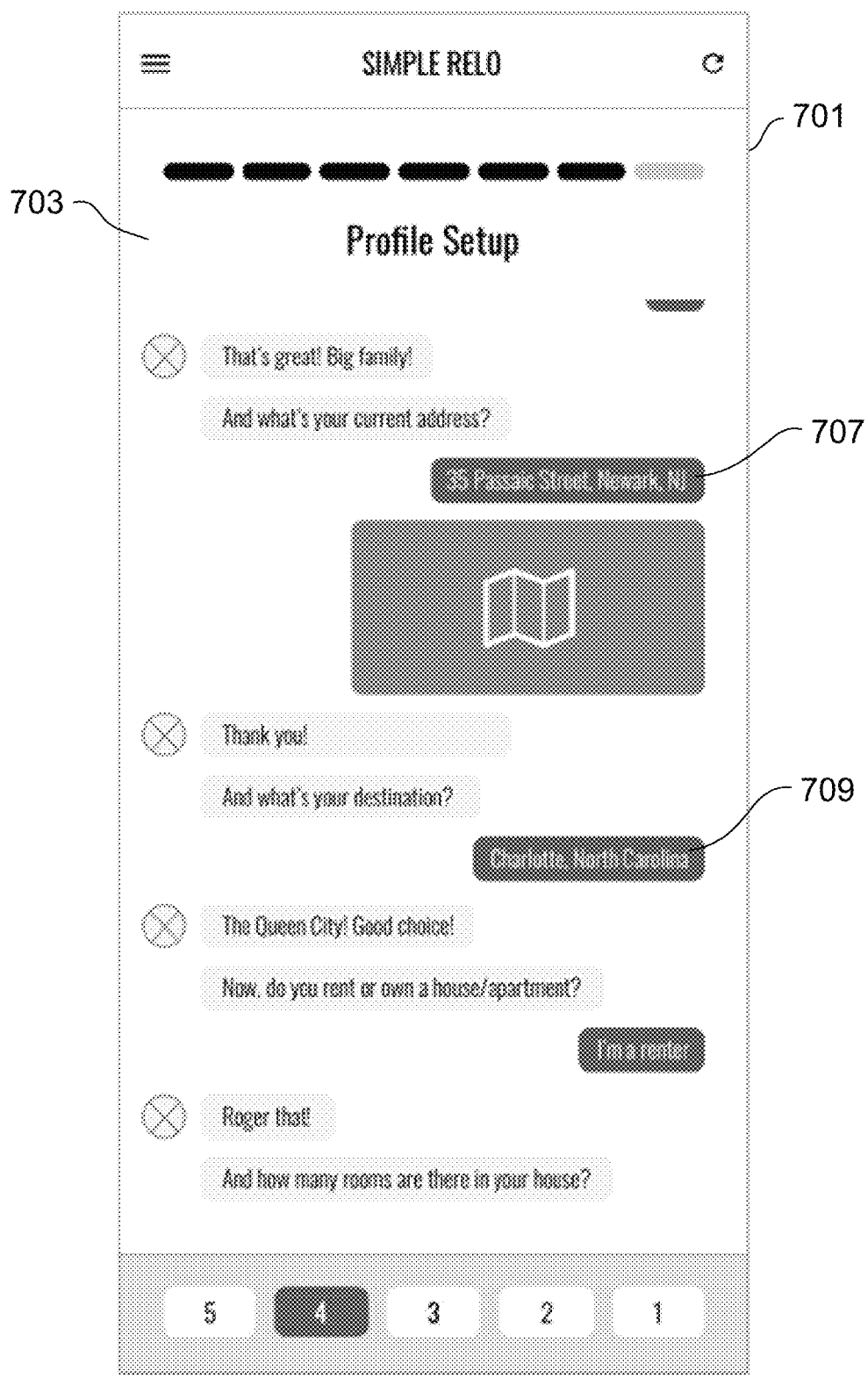
Figure 7C:
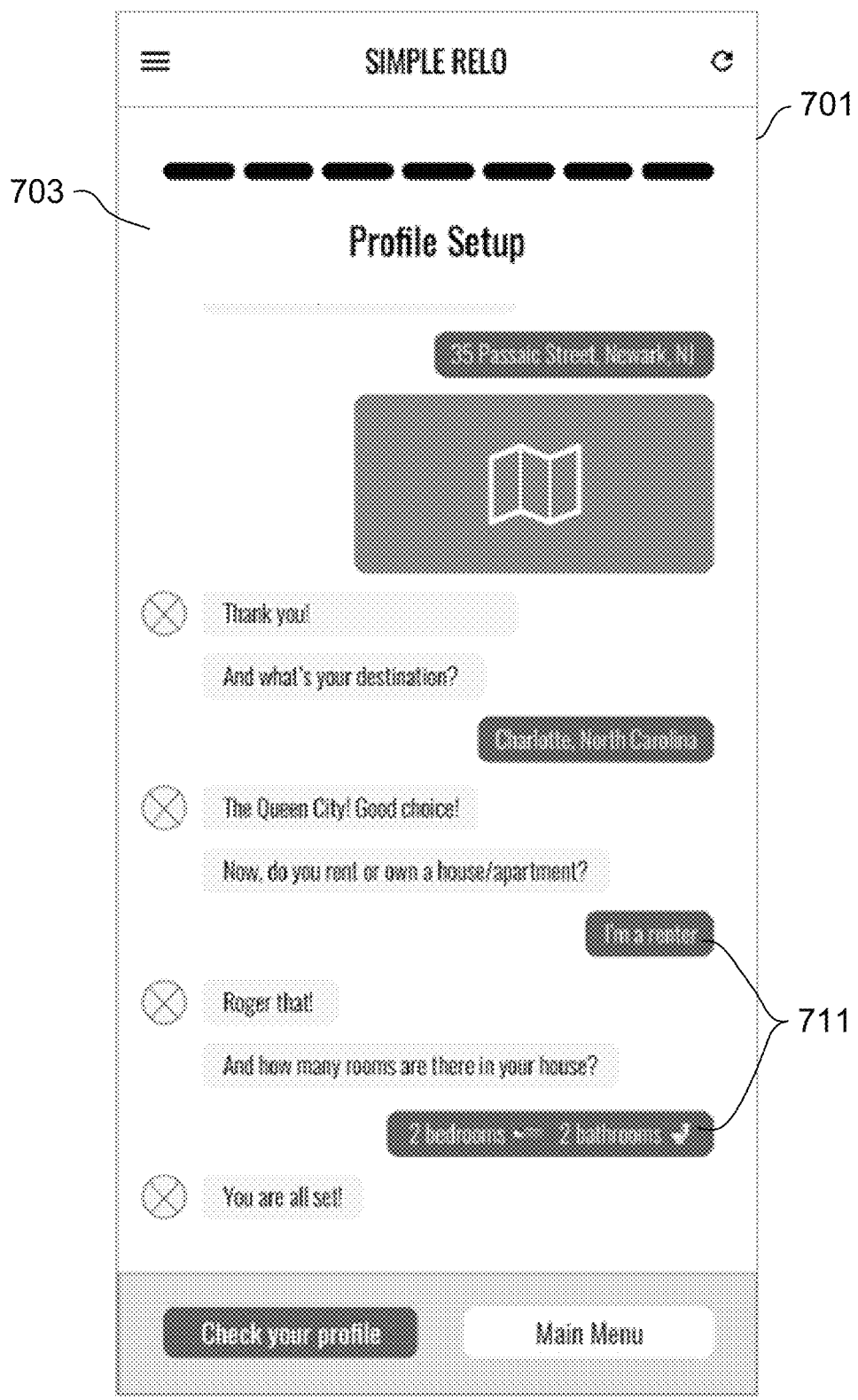

FIGS. 7A-7G show a relocation costs estimation application 700 downloaded on a mobile device 701 according to an embodiment of the present technology. Mobile device 701 has a display 703 and is configured to receive user inputs to enter the subject's relocation data and transmit the subject's relocation data to the server 101 for processing, as described above. In some embodiments, the relocation data is obtained by prompting the user to answer a series of questions. In some embodiments, the relocation data is obtained through a virtual chat between the user and a virtual assistant. In some embodiments, the user is the subject to be relocated, who interacts with application 700 to enter the supplemental assessment information 511. In some embodiments, the supplemental assessment information 511 includes family information 705, such as the subject's marital status and how many family members are relocating with the subject, as shown in FIG. 7A. In some embodiments, the supplemental assessment information 511 includes the subject's origin location 707 and the subject's destination location 709, as shown in FIG. 7B. In some embodiments, the origin location and destination location are each located in the United States and include each location's respective State and City. In some embodiments, the supplemental assessment information 511 includes the subject's household information 711, such as whether the subject rents or owns the subject's origin home and the number of rooms in the subject's origin home, as shown in FIG. 7C. In some embodiments, the subject's household information 711 further includes a room breakdown of the number of bedrooms and the number of bathrooms.

Figure 7D:
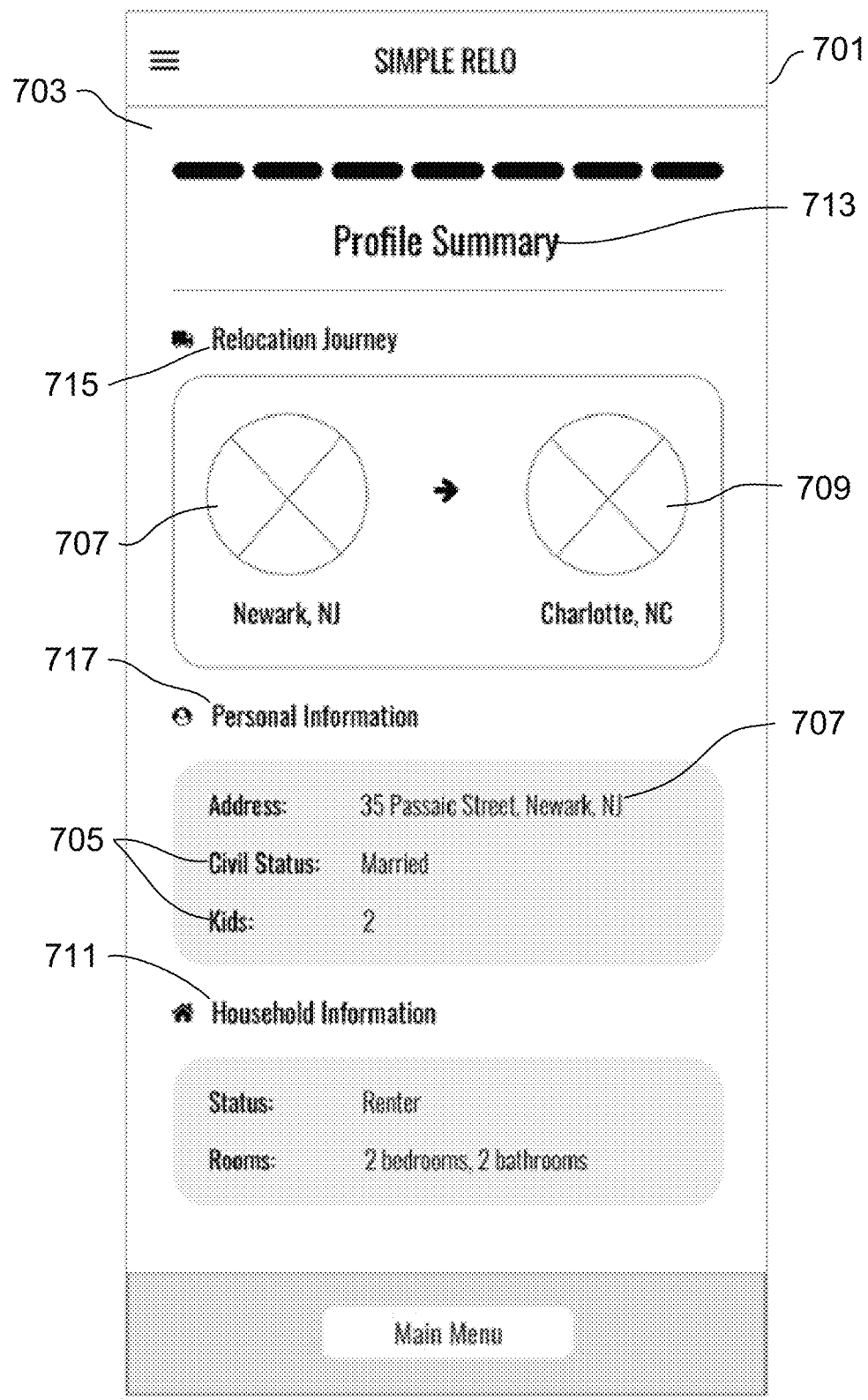

In some embodiments, the relocation costs estimation application 700 creates a profile summary 713 of the subject to be relocation based on the relocation data, as shown in FIG. 7D. In some embodiments, profile summary 713 includes relocation journey data 715, personal information 717, and household information 711. In some embodiments, relocation journey data 715 includes the subject's origin location 707 and the subject's destination location 709. In some embodiments, personal information 717 includes the subject's origin location 707 and the subject's family information 705. In some embodiments, profile summary 713 stores the relocation data such that the user can stop the data-entry process and continue entering the relocation data at a later time with the user's progress saved. When the user resumes entering the relocation data, the application 700 prompts the user to confirm previously entered information, such as relocation journey data 715 and household information 711, before resuming the data-entry process, as shown in FIG. 7E.

Figure 7E:
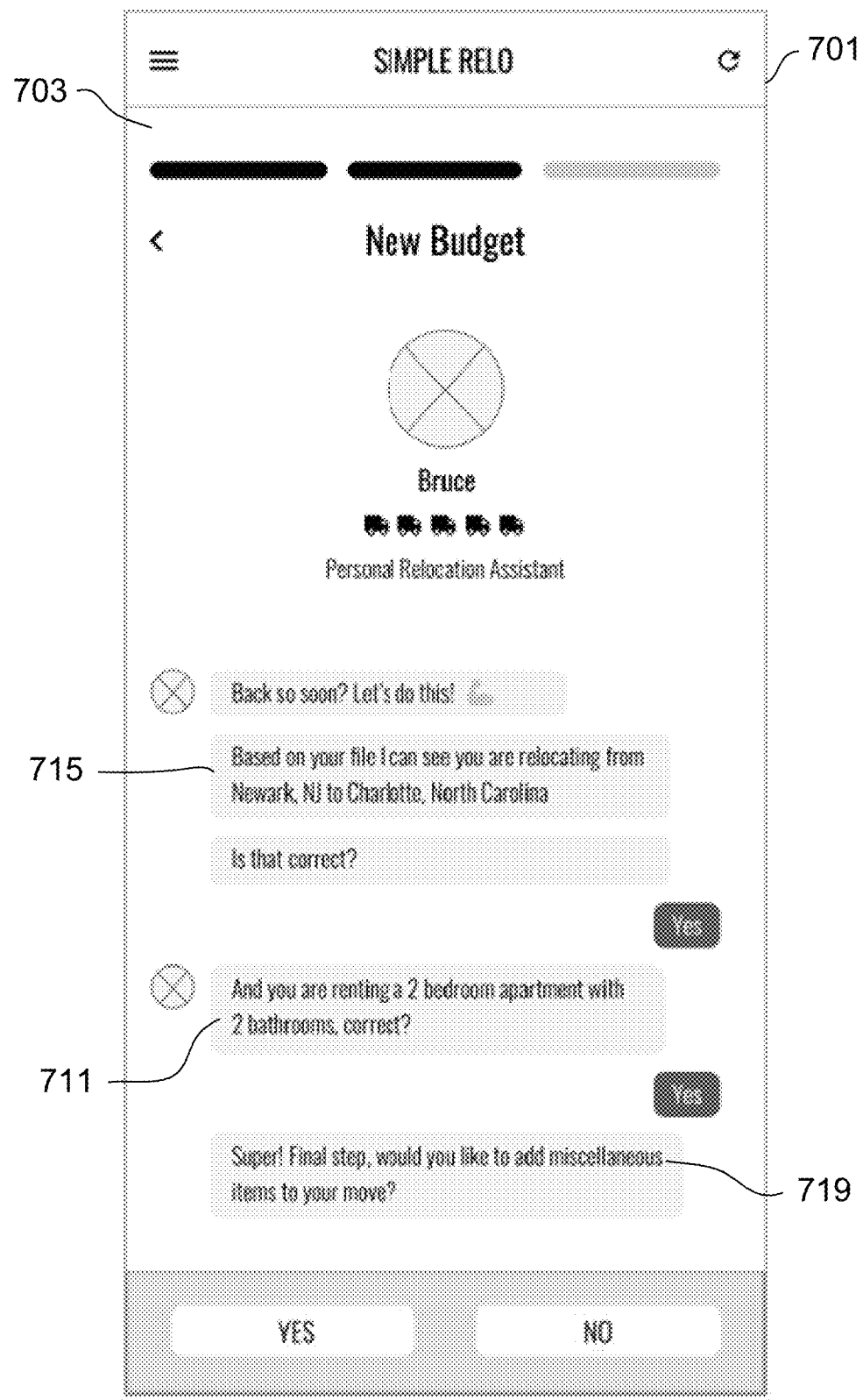
Figure 7F:

In some embodiments, the application 700 prompts the user to include miscellaneous items 719 in the supplemental assessment information 511, as shown in FIG. 7E. In some embodiments, miscellaneous items 719 include automobile transport 720, exercise equipment transport 721, recreation/lawn equipment transport 722, boat transport 723, pet transport 724 (which includes pet boarding in some embodiments), early termination of existing home-rental lease 725, valuable collection transport 726 (such as art, antiques, wine, etc.), large delicate goods transport 727 (e.g., delicate objects that cannot be easily or safely packaged in boxes, such as flat screen television sets, mirrors, etc.), temporary storage of goods 728, temporary living at destination 729, and changing drivers' licenses and automobile registrations 730, as shown in FIG. 7F. However, the miscellaneous items 719 shown in FIG. 7F do not represent an exhaustive list, and embodiments of the present technology contemplate prompting the user to list any number and variety of miscellaneous items 719 required to further optimize the estimated relocation costs.

Figure 7G:
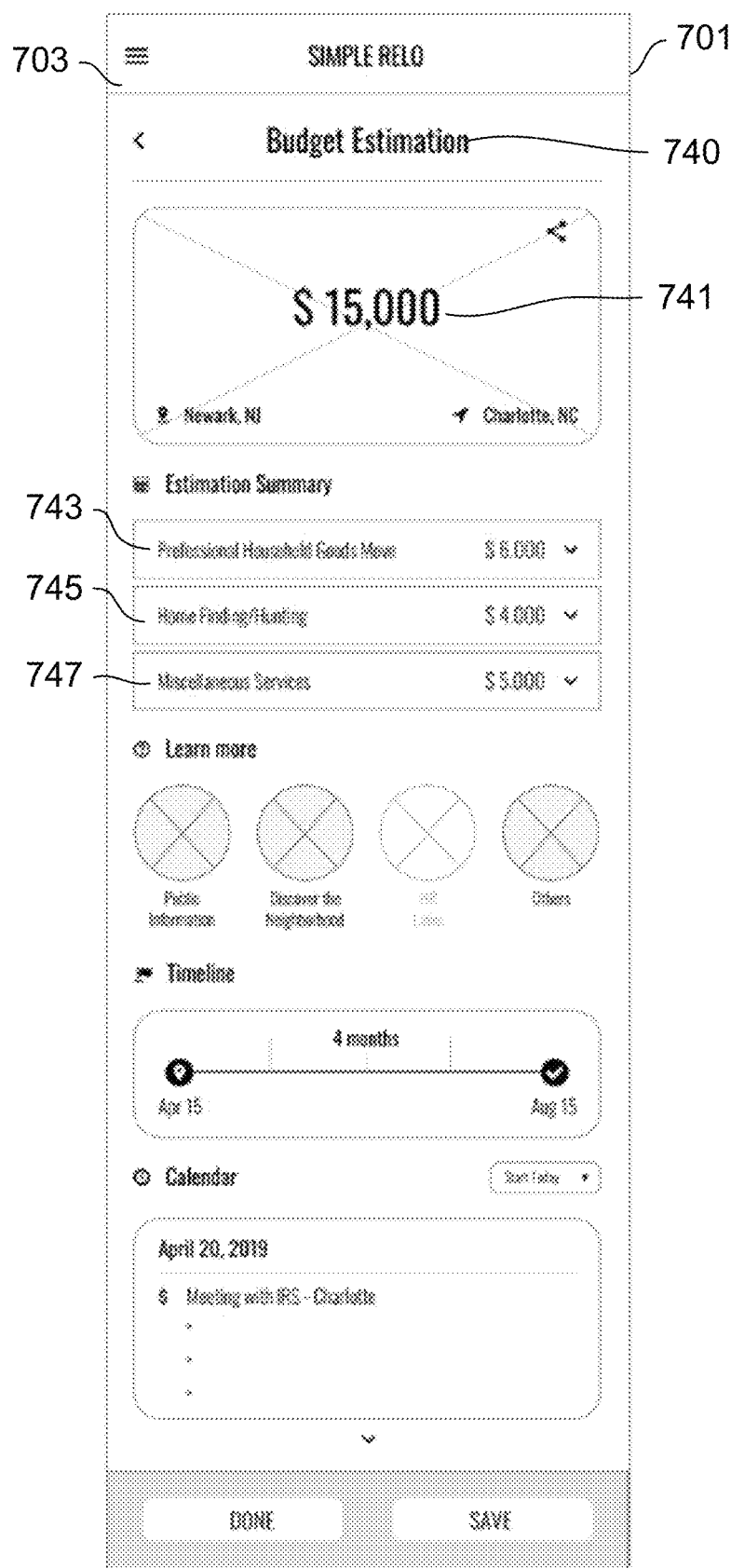

As shown in FIG. 7G, in some embodiments, application 700 displays a budget estimation 740 to the user after the relocation data is transmitted to the server 101 and processed as described above. In some embodiments, budget estimation 740 includes a total relocation costs estimate 741. In some embodiments, budget estimation 740 includes a breakdown of total relocation costs estimate 741 showing the relocation costs estimates for each required relocation service, such as, for example, professional household goods move costs estimate 743, home finding trip costs estimate 745, and miscellaneous services costs estimate 747. Miscellaneous services costs estimate 747 is preferably generated based on miscellaneous items 719. In some embodiments, miscellaneous service costs estimate 747 permits the budgeting of additional funds for costs associated with vehicle transport, pet transport, and pet boarding services. In some embodiments, the relocation costs estimates are displayed as an exact price, as shown in FIG. 7G. In some embodiments, the relocation costs estimates are displayed as a range of prices. Although FIGS. 7A-7G show an exemplary embodiment of a supplemental assessment relocation costs estimation, application 700 is used in some embodiments to perform a preliminary assessment relocation costs estimation, in which the preliminary assessment information 501 is input as described above by a user who is not the subject (e.g., an employer looking to relocate an employee).

Although the technology has been described and illustrated with respect to exemplary embodiments thereof, it should be understood by those skilled in the art that the foregoing and various other changes, omissions, and additions may be made there and thereto, without departing from the spirit and scope of the present technology.

What is claimed is:

1. A method of estimating relocation costs, comprising the steps of:
    generating, at a computing device, a first relocation costs data-model for a first relocation service;
    performing a dual-model algorithm on the first relocation costs data-model to determine a first preliminary relocation costs predictive model for the first relocation service;
    receiving, at the computing device and from a remote device; a first dataset of a subject to be relocated, the first dataset comprising the subject's origin location, the subject's destination location, the distance between the origin and destination locations, the subject's job level, and the subject's family size;
    analyzing the first dataset with the first preliminary relocation costs predictive model to generate a first preliminary relocation costs for the first relocation service;
    displaying, on a display of the remote device, the first preliminary relocation costs for the first relocation service;
    performing the dual-model algorithm on the first relocation costs data-model to determine a first supplemental relocation costs predictive model for the first relocation service;
    receiving, at the computing device and from the remote device, a second dataset of the subject to be relocated, the second dataset comprising the subject's origin location, the subject's destination location, the distance between the origin and destination locations, the subject's job level, the subject's family size, the subject's origin home type, and the number of rooms in the subject's origin home;
    analyzing the second dataset with the first supplemental relocation costs predictive model to generate a first supplemental relocation costs for the first relocation service; and
    displaying, on the display of the remote device, the first supplemental relocation costs for the first relocation service.

2. The method of claim 1, wherein performing the dual-model algorithm on the first relocation costs data-model to determine a first preliminary relocation costs predictive model for the first relocation service comprises the steps of:
    determining, from the first relocation costs data-model, a first preliminary training dataset and a first preliminary holdout dataset;
    selecting a first preliminary target model optimization metric and a first preliminary uncertainty model optimization metric;
    forming a first preliminary target regression model for the first preliminary training dataset;
    training the first preliminary target regression model via the first preliminary target model optimization metric in a target model space comprising a plurality of regression models to determine a first preliminary optimal target regression model;
    forming a first preliminary uncertainty dataset by inputting the first preliminary holdout dataset into the first preliminary optimal target regression model;
    determining a first preliminary absolute residuals dataset from the first preliminary uncertainty dataset and a first preliminary truth target value dataset for the first preliminary holdout dataset;
    forming a first preliminary uncertainty regression model from the first preliminary absolute residuals dataset and the first preliminary optimal target regression model;
    training the first preliminary uncertainty regression model via the first preliminary uncertainty model optimization metric in a prediction band model space comprising the plurality of regression models to determine a first preliminary optimal uncertainty regression model; and
    forming the first preliminary relocation costs predictive model from the first preliminary optimal target regression model and the first preliminary optimal uncertainty regression model.

3. The method of claim 1, wherein performing the dual-model algorithm on the first relocation costs data-model to determine a first supplemental relocation costs predictive model for the first relocation service comprises the steps of:
    determining, from the first relocation costs data-model, a first supplemental training dataset and a first supplemental holdout dataset;
    selecting a first supplemental target model optimization metric and a first supplemental uncertainty model optimization metric;
    forming a first supplemental target regression model for the first supplemental training dataset;
    training the first supplemental target regression model via the first supplemental target model optimization metric in a target model space comprising a plurality of regression models to determine a first supplemental optimal target regression model;
    forming a first supplemental uncertainty dataset by inputting the first supplemental holdout dataset into the first supplemental optimal target regression model;

determining a first supplemental absolute residuals dataset from the first supplemental uncertainty dataset and a first supplemental truth target value dataset for the first supplemental holdout dataset;

forming a first supplemental uncertainty regression model from the first supplemental absolute residuals dataset and the first supplemental optimal target regression model;

training the first supplemental uncertainty regression model via the first supplemental uncertainty model optimization metric in a prediction band model space comprising the plurality of regression models to determine a first supplemental optimal uncertainty regression model; and forming the first supplemental relocation costs predictive model from the first supplemental optimal target regression model and the first supplemental optimal uncertainty regression model.

4. The method of claim 1, further comprising:

generating, at the computing device, a second relocation costs data-model for a second relocation service;

performing the dual-model algorithm on the second relocation costs data-model to determine a second preliminary relocation costs predictive model for the second relocation service;

analyzing the first dataset with the second preliminary relocation costs predictive model to generate a second preliminary relocation costs for the second relocation service;

generating a total preliminary relocation costs from the first preliminary relocation costs and the second preliminary relocation costs;

displaying, on the display of the remote device, the total preliminary relocation costs;

performing the dual-model algorithm on the second relocation costs data-model to determine a second supplemental relocation costs predictive model for the second relocation service;

analyzing the second dataset with the second supplemental relocation costs predictive model to generate a second supplemental relocation costs for the second relocation service;

generating a total supplemental relocation costs from the first supplemental relocation costs and the second supplemental relocation costs; and displaying, on the display of the remote device, the total supplemental relocation costs.

5. The method of claim 4, wherein performing the dual-model algorithm on the second relocation costs data-model to determine a second preliminary relocation costs predictive model for the second relocation service comprises the steps of:

determining, from the second relocation costs data-model, a second preliminary training dataset and a second preliminary holdout dataset;

selecting a second preliminary target model optimization metric and a second preliminary uncertainty model optimization metric;

forming a second preliminary target regression model for the second preliminary training dataset;

training the second preliminary target regression model via the second preliminary target model optimization metric in a target model space comprising a plurality of regression models to determine a second preliminary optimal target regression model;

forming a second preliminary uncertainty dataset by inputting the second preliminary holdout dataset into the second preliminary optimal target regression model;

determining a second preliminary absolute residuals dataset from the second preliminary uncertainty dataset and a second preliminary truth target value dataset for the second preliminary holdout dataset;

forming a second preliminary uncertainty regression model from the second preliminary absolute residuals dataset and the second preliminary optimal target regression model;

training the second preliminary uncertainty regression model via the second preliminary uncertainty model optimization metric in a prediction band model space comprising the plurality of regression models to determine a second preliminary optimal uncertainty regression model; and forming the second preliminary relocation costs predictive model from the second preliminary optimal target regression model and the second preliminary optimal uncertainty regression model.

6. The method of claim 4, wherein performing the dual-model algorithm on the second relocation costs data-model to determine a second supplemental relocation costs predictive model for the second relocation service comprises the steps of:

determining, from the second relocation costs data-model, a second supplemental training dataset and a second supplemental holdout dataset;

selecting a second supplemental target model optimization metric and a second supplemental uncertainty model optimization metric;

forming a second supplemental target regression model for the second supplemental training dataset;

training the second supplemental target regression model via the second supplemental target model optimization metric in a target model space comprising a plurality of regression models to determine a second supplemental optimal target regression model;

forming a second supplemental uncertainty dataset by inputting the second supplemental holdout dataset into the second supplemental optimal target regression model;

determining a second supplemental absolute residuals dataset from the second supplemental uncertainty dataset and a second supplemental truth target value dataset for the second supplemental holdout dataset;

forming a second supplemental uncertainty regression model from the second supplemental absolute residuals dataset and the second supplemental optimal target regression model;

training the second supplemental uncertainty regression model via the second supplemental uncertainty model optimization metric in a prediction band model space comprising the plurality of regression models to determine a second supplemental optimal uncertainty regression model; and forming the second supplemental relocation costs predictive model from the second supplemental optimal target regression model and the second supplemental optimal uncertainty regression model.

7. The method of claim 1, wherein the first dataset of the subject to be relocated is received from a first remote device of a first user, and the second dataset of the subject to be relocated is received from a second remote device of a second user; and wherein the first preliminary relocation costs is displayed on a display of the first remote device, and the first supplemental relocation costs is displayed on the display of the first remote device and a display of the second remote device.

8. The method of claim 7, wherein the first user is an employer contemplating relocating the subject, and the subject is an employee requiring relocation.

9. The method of claim 1, wherein the relocation service is a van-line move, a van-line move with storage, a return trip home, a temporary living move, a vehicle transport, a home finding trip, a family travel, a pet transport, a pet storage, a career-assistance service, or a rental-assistance service.

10. The method of claim 1, wherein the computing device comprises a processor and a memory, and wherein the computing device and the remote device are communicatively coupled through a network.

11. A system of estimating relocation costs, comprising:

a network;

a first remote device and a second remote device; and a computing device comprising a processor, wherein the first and second remote devices are communicatively coupled to the computing device through the network, and wherein the computing device is configured to:
generate a first relocation costs data-model for a first relocation service;
perform, by the processor, a dual-modal algorithm on the first relocation costs data-model to determine a first preliminary relocation costs predictive model for the first relocation service;
receive, from the first remote device, a first dataset of a subject to be relocated, the first dataset comprising the subject's origin location, the subject's destination location, the distance between the origin and destination locations, the subject's job level, and the subject's family size;
analyze, by the processor, the first dataset with the first preliminary relocation costs predictive model to generate a first preliminary relocation costs for the first relocation service;
transmit, via the network, the first preliminary relocation costs to the first remote device;
perform, by the processor, the dual-model algorithm on the first relocation data-model to determine a first supplemental relocation costs predictive model for the first relocation service;
receive, from the second remote device, a second dataset of the subject to be relocated, the second dataset comprising the subject's origin location, the subject's destination location, the distance between the origin and destination locations, the subject's job level, the subject's family size, the subject's origin home type, and the number of rooms in the subject's origin home;
analyze, by the processor, the second dataset with the first supplemental relocation costs predictive model to generate a first supplemental relocation costs for the first relocation service; and
transmit, via the network, the first supplemental relocation costs to the first and second remote devices.

12. The system of claim 11, wherein the computing device is further configured to:
generate a second relocation costs data-model for a second relocation service;
perform, by the processor, the dual-model algorithm on the second relocation data-model to determine a second preliminary relocation costs predictive model for the second relocation service;
analyze, by the processor, the first dataset with the second preliminary relocation costs predictive model to generate a second preliminary relocation costs for the second relocation service;
transmit, via the network, the second preliminary relocation costs to the first remote device;
perform, by the processor, the dual-model algorithm on the second relocation data-model to determine a second supplemental relocation costs predictive model for the second relocation service;
analyze, by the processor, the second dataset with the second supplemental relocation costs predictive model to generate a second supplemental relocation costs for the second relocation service; and
transmit, via the network, the second supplemental relocation costs to the first and second remote devices.

13. The system of claim 11, wherein the computing device is further configured to:
generate a total preliminary relocation costs from the first preliminary relocation costs and the second preliminary relocation costs;
transmit, via the network, the total preliminary relocation costs to the first remote device;
generate a total supplemental relocation costs from the first supplemental relocation costs and the second supplemental relocation costs;
transmit, via the network, the total supplemental relocation costs to the first and second remove devices.

14. The system of claim 11, wherein the dual-model algorithm comprises the steps of:
determining, from the relocation costs data-model, a training dataset and a holdout dataset;
selecting a target model optimization metric and an interval model optimization metric;
forming a target regression model for the training dataset;
training the target regression model per the target model optimization metric in a target model space comprising a plurality of regression models to determine an optimal target regression model;
forming a prediction band model from the optimal target regression model;
training the prediction band model per the interval model optimization metric in a prediction band model space comprising the plurality of regression models to determine an optimal prediction band regression model; and
forming a relocation costs prediction model from the optimal target regression model and the optimal prediction band regression model.

15. The system of claim 14, wherein forming the prediction band model comprises the steps of:
forming a prediction dataset by inputting the holdout dataset into the optimal target regression model;
determining an absolute residuals dataset from the prediction dataset and a truth target value dataset for the holdout dataset; and
forming the prediction band model from the absolute residuals dataset and the optimal target regression model.

16. The system of claim 14, wherein the training dataset and the holdout dataset each represent about 50% of the relocation costs data-model.

17. An apparatus for estimating relocation costs, comprising:
a memory storing computer-executable instructions that, when executed by a processor, cause the apparatus to:
generate a first relocation costs data-model for a first relocation service;
perform a dual-modal algorithm on the first relocation costs data-model to determine a first preliminary relocation costs predictive model and a first supplemental relocation costs predictive model for the first relocation service;
receive a first dataset of a subject to be relocated, the first dataset comprising the subject's origin location, the subject's destination location, the distance between the origin and destination locations, the subject's job level, and the subject's family size;
analyze the first dataset with the first preliminary relocation costs predictive model to generate a first preliminary relocation costs for the first relocation service;
transmit, via a network, the first preliminary relocation costs to a remote device;
receive a second dataset of the subject to be relocated, the second dataset comprising the subject's origin location, the subject's destination location, the distance between the origin and destination locations, the subject's job level, the subject's family size, the subject's origin home type, and the number of rooms in the subject's origin home;
analyze the second dataset with the first supplemental relocation costs predictive model to generate a first supplemental relocation costs for the first relocation service; and
transmit, via the network, the first supplemental relocation costs to the remote device.

18. The apparatus of claim 17, further comprising computer-executable instructions stored on the memory that, when executed by the processor, cause the apparatus to:
generate a second relocation costs data-model for a second relocation service;
perform the dual-modal algorithm on the second relocation costs data-model to determine a second preliminary relocation costs predictive model and a second supplemental relocation costs predictive model for the second relocation service;
analyze the first dataset with the second preliminary relocation costs predictive model to generate a second preliminary relocation costs for the second relocation service;
transmit, via the network, the second preliminary relocation costs to the remote device;
analyze the second dataset with the second supplemental relocation costs predictive model to generate a second supplemental relocation costs for the second relocation service;
transmit, via the network, the second supplemental relocation costs to the remote device;
generate a total preliminary relocation costs from the first preliminary relocation costs and the second preliminary relocation costs;
transmit, via the network, the total preliminary relocation costs to the remote device;
generate a total supplemental relocation costs from the first supplemental relocation costs and the second supplemental relocation costs;
transmit, via the network, the total supplemental relocation costs to the remove device.

19. The apparatus of claim 17, wherein the first dataset of the subject to be relocated is received from a first remote device of a first user, and the second dataset of the subject to be relocated is received from a second remote device of a second user; and
wherein the first preliminary relocation costs is transmitted to the first remote device, and the first supplemental relocation costs is transmitted to the first and second remote devices.

20. The apparatus of claim 17, wherein the dual-model algorithm comprises the steps of:
determining, from the relocation costs data-model, a training dataset and a holdout dataset;
selecting a target model optimization metric and an interval model optimization metric;
forming a target regression model for the training dataset;
training the target regression model per the target model optimization metric in a model space comprising a plurality of regression models to determine an optimal target regression model;
forming a prediction dataset by inputting the holdout dataset into the optimal target regression model;
determining an absolute residuals dataset from the prediction dataset and a truth target value dataset for the holdout dataset;
forming a prediction band model from the absolute residuals dataset and the optimal target regression model;
training the prediction band model per the interval model optimization metric in the model space to determine an optimal prediction band regression model; and
forming a relocation costs prediction model from the optimal target regression model and the optimal prediction band regression model.

* * * * *